(12) United States Patent
Yin et al.

(10) Patent No.: US 12,506,894 B2
(45) Date of Patent: Dec. 23, 2025

(54) RESHAPER FOR LEARNING BASED IMAGE/VIDEO CODING

(71) Applicant: DOLBY LABORATORIES LICENSING CORPORATION, San Francisco, CA (US)

(72) Inventors: Peng Yin, Ithaca, NY (US); Fangjun Pu, Sunnyvale, CA (US); Taoran Lu, Santa Clara, CA (US); Arjun Arora, Sunnyvale, CA (US); Guan-Ming Su, Fremont, CA (US); Tao Chen, Palo Alto, CA (US); Sean Thomas McCarthy, San Francisco, CA (US); Walter J. Husak, Simi Valley, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 45 days.

(21) Appl. No.: 18/687,768

(22) PCT Filed: Aug. 5, 2022

(86) PCT No.: PCT/US2022/039593
§ 371 (c)(1),
(2) Date: Feb. 28, 2024

(87) PCT Pub. No.: WO2023/033991
PCT Pub. Date: Mar. 9, 2023

(65) Prior Publication Data
US 2024/0422345 A1 Dec. 19, 2024

Related U.S. Application Data

(60) Provisional application No. 63/238,529, filed on Aug. 30, 2021.

(30) Foreign Application Priority Data

Aug. 30, 2021 (EP) .................................... 21193790

(51) Int. Cl.
*H04N 19/517* (2014.01)
*H04N 19/117* (2014.01)
*H04N 19/82* (2014.01)

(52) U.S. Cl.
CPC ......... *H04N 19/517* (2014.11); *H04N 19/117* (2014.11); *H04N 19/82* (2014.11)

(58) Field of Classification Search
CPC .... H04N 19/117; H04N 19/186; H04N 19/30; H04N 19/46; H04N 19/517; H04N 19/82;
(Continued)

(56) References Cited

U.S. PATENT DOCUMENTS 8,811,490 B2 8/2014 Su
10,080,026 B2 9/2018 Su
(Continued)

FOREIGN PATENT DOCUMENTS

WO 2018064591 A1 4/2018
WO 2019199701 A1 10/2019
WO 2021168001 A1 8/2021

OTHER PUBLICATIONS

Alshina E et al, "JVET AHG report: Neural network-based video coding (AHGII)", 23rd JVET Meeting; Jul. 7, 2021-Jul. 16, 2021; Teleconference; (The Joint Video Exploration Team of ISO/IEC JTC1/SC29/WG11 AND ITU-T SG.16 ), No. JVET-W0011; m572597, Jul. 2021, 7 Pages.
(Continued)

*Primary Examiner* — Md N Haque

(57) ABSTRACT

An input image represented in an input domain is received from an input video signal. Forward reshaping is performed on the input image to generate a forward reshaped image
(Continued)

represented in a reshaped image domain. Non-reshaping encoding operations are performed to encode the reshaped image into an encoded video signal. At least one of the non-reshaping encoding operations is implemented with an ML model that has been previously trained with training images in one or more training datasets in a preceding training stage. A recipient device of the encoded video signal is caused to generate a reconstructed image from the forward reshaped image.

15 Claims, 11 Drawing Sheets

(58) Field of Classification Search
CPC .... H04N 19/85; G06N 3/0455; G06N 3/0464; G06N 3/0495; G06N 3/08
See application file for complete search history.

(56) References Cited

U.S. PATENT DOCUMENTS

| | | | |
|---|---|---|---|
| 10,136,162 | B2 | 11/2018 | Qu |
| 11,277,627 | B2 | 3/2022 | Song |
| 11,962,760 | B2 | 4/2024 | Su |
| 12,149,753 | B2 | 11/2024 | Su |
| 2018/0020224 | A1* | 1/2018 | Su ................. H04N 19/192 |
| 2018/0124399 | A1* | 5/2018 | Su ................. H04N 19/30 |
| 2020/0090506 | A1* | 3/2020 | Chen ............ G06V 30/18057 |
| 2020/0280831 | A1* | 9/2020 | Booij ............... H04L 65/80 |
| 2021/0076079 | A1 | 3/2021 | Lu |
| 2021/0150812 | A1 | 5/2021 | Su |
| 2023/0300381 | A1 | 9/2023 | Su |

OTHER PUBLICATIONS

Carl de Boor, "A Practical Guide to Splines", 1978, 4 Pages.

G. Lu, et al., "DVC: An End-To-End Deep Video Compression Framework," 2019 IEEE/CVF Conference on Computer Vision and Pattern Recognition (CVPR), Long Beach, CA, USA, Jan. 9, 2020, pp. 10998-11007, 10 Pages.

Hartmut Prautzsch, et al. "B'ezier- and B-spline technique", Mathematics and Visualization, Mar. 26, 2002, 58 Pages.

ITU Rec. ITU-R BT. 1886, "Reference electro-optical transfer function for flat panel displays used in HDTV studio production BT", BT Series Broadcasting service, 2017, 7 Pages.

Jean Bégaint, et al., "CompressAI: a PyTorch library and evaluation platform for end-to-end compression research", Computer Vision and Pattern Recognition, Nov. 5, 2020, 19 Pages.

E. Francois, et al., JVET-V0108, "AHG9: AHG9: Colour Transform Information SEI message", Joint Video Experts Team (JVET) of ITU-T SG16WP 3 and ISO/IEC JTC 1/SC 29 22nd Meeting, by teleconference, Apr. 20-28, 2021, 6 Pages.

Lu T., et al: "CE12: Mapping functions (test CE12-1 and CE12-2)", 125. MPEG Meeting; Jan. 14, 2019-Jan. 18, 2019; Marrakech; (Motion Picture Expert Group or ISO/IEC JTC1/SC29/WG11), No. m45700, JVET-M0427, Jan. 15, 2019, 15 Pages.

Rec. ITU-R BT.2100, "Image parameter values for high dynamic range television for use in production and international programme exchange", BT Series Broadcasting service, 2017, 16 Pages.

Series H: Audiovisual and Multimedia Systems, Infrastructure of audiovisual services—"Coding of moving video", ITU-T H.266, Aug. 2020, 516 Pages.

Series H: Audiovisual and Multimedia Systems, Infrastructure of audiovisual services—Coding of moving video, "Advanced video coding for generic audiovisual services", ITU-T H.264, Jun. 2019, 836 Pages.

Series H: Audiovisual and Multimedia Systems, Infrastructure of audiovisual services—Coding of moving video, "High efficiency video coding", ITU-T H.265 , Nov. 2019, 712 Pages.

SMPTE ST 2084:2014 "High Dynamic Range EOTF of Mastering Reference Displays", Aug. 16, 2014, 15 Pages.

* cited by examiner

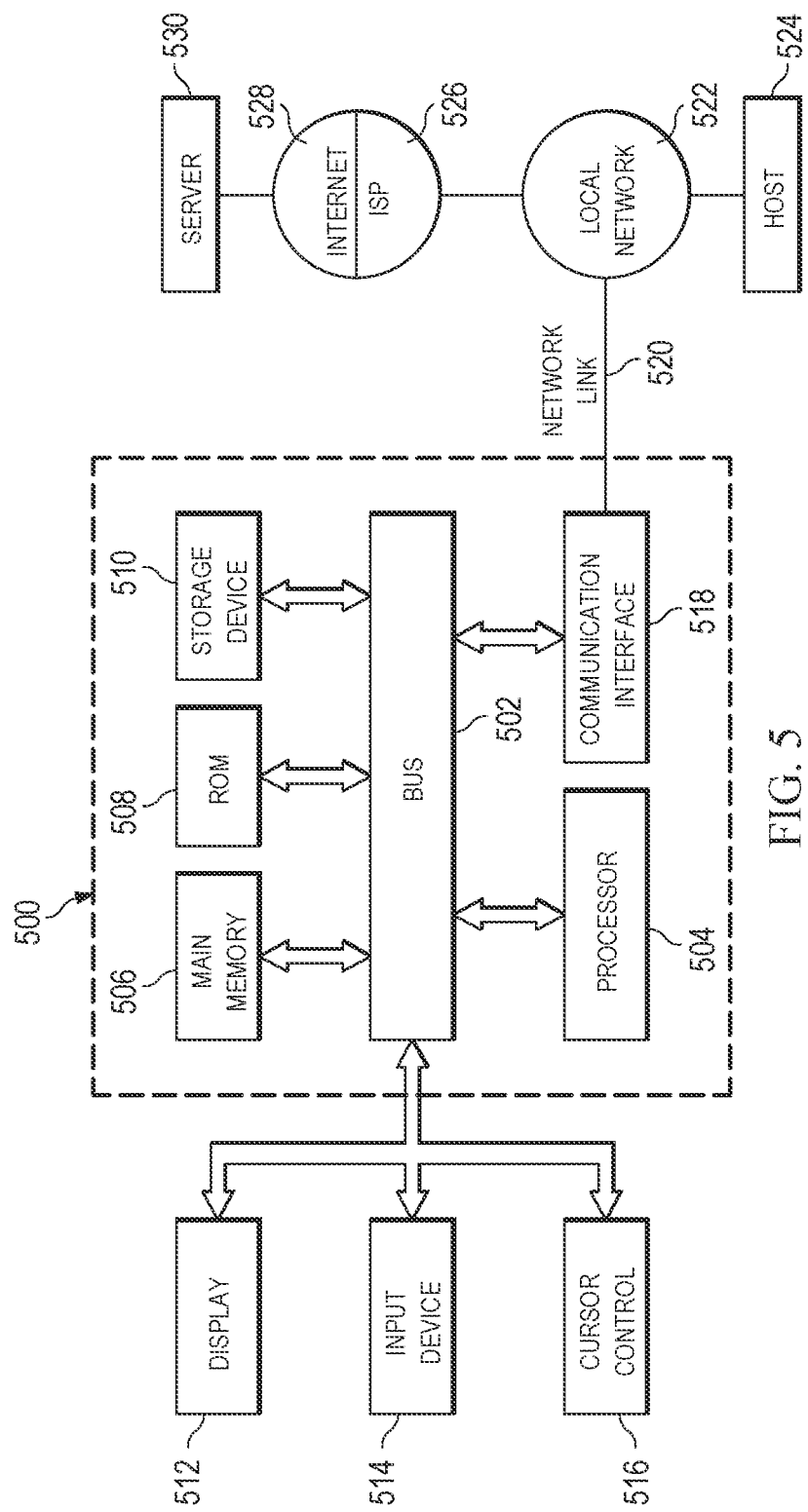

RESHAPER FOR LEARNING BASED IMAGE/VIDEO CODING

CROSS-REFERENCE TO RELATED APPLICATIONS

This application is a U.S. National Stage of International Application No. PCT/US2022/039593, filed Aug. 5, 2022, which claims priority to European Patent Application No. 21193790.9, filed Aug. 30, 2021, and U.S. Provisional Patent Application No. 63/238,529, filed Aug. 30, 2021, each of which is hereby incorporated by reference in their entireties

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "*Image parameter values for high dynamic range television for use in production and international programme exchange*," (June 2017). As appreciated by the inventors here, improved techniques for composing video content data that can be used to efficiently support display capabilities of a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 5 illustrates a simplified block diagram of an example hardware platform on which a computer or a computing device as described herein may be implemented.

DESCRIPTION OF EXAMPLE EMBODIMENTS

Figure 1A:
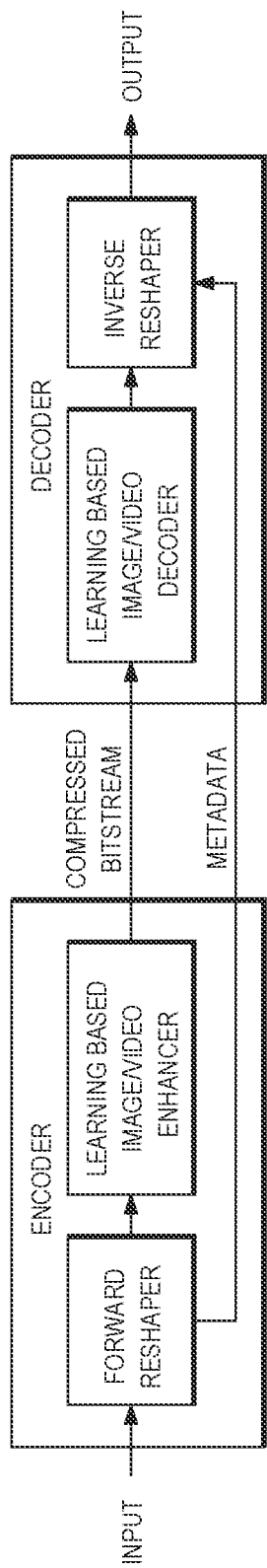
FIG. 1A through FIG. 1E illustrate example codec architectures in which image/video reshapers (or reshaping modules) operate within or in conjunction with learning based image/video codecs.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

Under some approaches, performance for learning based image/video coding can be highly dependent on the training datasets. For example, a machine learning (ML) model is trained using a training dataset or database of SDR images/videos. Image/video coding incorporating inference from the trained model may not perform well for HDR images/videos, as compared with the same model that is trained using training dataset or database of HDR images/videos. Even when both training images and non-training images are the same or similar color grade of (e.g., SDR, etc.) images/videos, the training images can still be different from the non-training images in certain image/video characteristics (e.g., visually perceptible characteristics, non-visual characteristics, etc.). For example, non-training images/videos in the application or inference stage of the model may be composite images/videos including textual and pictorial regions such as screen content (SCC) images/videos, whereas the training images/videos in the training stage of the model may be non-SCC images/videos. As a result, image/video coding incorporating inference from the trained model may not perform well for SCC images/videos.

In contrast, reshaping techniques as described herein can be implemented in (deep learning based) image/video codecs in conjunction with image/video coding techniques incorporating inference from trained ML models to improve coding efficiency as well as to provide adaptivity with respect to non-training images/videos that may or may not have the same (or similar) image/video characteristics as training images/videos.

These techniques can be implemented in a variety of standard based and/or proprietary system configurations in video codecs. Some or all reshaping operations as described herein can be implemented as in-loop operations (as a part of image/video encoding/decoding operations) or as out-of-loop operations (as a part of preprocessing or postprocessing operations/tools before or after the image/video encoding/decoding operations). Operational parameters used in the reshaping operations can be signaled from an upstream encoding device to a recipient device in a video signal encoded with syntaxes or syntax elements in accordance with an applicable image/video coding syntax specification. Example reshaping operations are described in U.S. Pat. No. 10,080,026; PCT Application Ser. No. PCT/US2019/031620, filed on May 9, 2019, the entire contents of which are hereby incorporated by reference as if fully set forth herein.

Example image/video coding syntax specifications may include, but are not necessarily limited to only, any of: Dolby Vision coding syntax specification, Versatile Video Coding or VVC specification, etc. Example syntaxes or syntax elements may include, but are not necessarily limited to only, any relating to one or more of: supplemental enhanced information or SEI message, coding data unit header fields, Luma Mapping Chroma Scaling or LMCS data fields, data fields relating to in-loop operations, data fields relating to out-of-loop operations, etc. Example image processing operations relating to LMCS are described in U.S. Patent Application Publication No. 2021/0076079, which is incorporated herein by reference in its entirety.

In some operational scenarios, reshaping operations as described herein can be global reshaping operations that apply the same reshaping mapping to some or all images received in a video signal to generate corresponding reshaped or reconstructed images. Reshaping operational parameters that specify individual reshaping mappings/functions for individual images/pictures need not be sent in an encoded video signal from an upstream device to a downstream recipient device. The upstream device can simply signal to the downstream recipient device an identifier via one or more relatively high level reshaping parameters or flags that identifies a preconfigured, prestored or fixed global reshaping mapping/function such as a multi-piece polynomial, a lookup table, etc., for the downstream recipient device to use in reshaping operations.

In some operational scenarios, reshaping operations as described herein can be image adaptive reshaping operations that apply a (e.g., possibly different, etc.) individual reshaping mapping/functions to each individual image in some or all images received in a video signal to generate reshaped or reconstructed images. Reshaping operational parameters—e.g., in addition to relatively high level reshaping parameters or flags, etc.—that can be used to derive the individual reshaping mappings/functions can be encoded in an encoded video signal and signaled from an upstream device to a downstream recipient device.

Under other approaches that do not implement reshaping techniques as described herein, as previously noted, ML models may not perform well in inference with respect to images/videos that are different from training images/videos in some characteristics (e.g., different dynamic ranges, different visually perceptible characteristics, etc.). To resolve this issue, some or all of these ML models may need to be trained with many different types of training images/videos in a model training stage. In addition, numerous model parameters (e.g., model parameters used in neural networks, etc.) used in the ML models may need to be optimized and signaled adaptively with different input images in a model deployment or inference stage.

In contrast, under techniques as described herein, instead of training and adaptively optimizing/adjusting/signaling/transmitting numerous model parameters used in the ML models, relatively few reshaping operational parameters such as polynomial coefficients (e.g., specifying or defining piecewise linear or non-linear reshaping functions/mappings, etc.), MMR coefficients (e.g., specifying or defining MMR-based cross-channel reshaping functions/mappings), TPB coefficients (e.g., specifying or defining Tensor-Product-B-Spline based reshaping functions/mappings), etc., can be adaptively optimized/adjusted/signaled/transmitted by an upstream encoding device to a recipient device. Example multiple color channel multiple regression (MMR) based operations are described in U.S. Pat. No. 8,811,490, which are incorporated by reference in its entirety as if fully set forth herein. Example TPB based operations are described in U.S. Provisional Application Ser. No. 62/908,770, titled "TENSOR-PRODUCT B-SPLINE PREDICTOR," filed on Oct. 1, 2019, which are incorporated by reference in its entirety as if fully set forth herein.

Reshaping operations specified with these reshaping operational parameters can be individually tailored or generated for individual input images, even if these input images have no similar images in the training images/videos used to train the ML models, thereby providing better adaptivity to different characteristics of the input images.

Image/video reshaping in learning based image/video coding (e.g., encoding, decoding, compression, decompression, etc.) can be implemented or performed via explicit mapping (or parametric mapping) or implicit mapping (non-parametric mapping).

For the explicit mapping, the image/video reshaping can reshape input images into reshaped images, using reshaping functions/mappings explicitly specified or represented with reshaping operational parameters such as operational parameter for polynomial, MMR, or B-spline functions or tensor product of B-spline functions, etc. The reshaping operational parameters can be obtained or generated with ML models such as those based on neural networks or with other optimization methods such as solving optimization problems that minimize estimation/prediction errors.

For the implicit mapping, the image/video reshaping can reshape to-be-reshaped images into reshaped images using a ML-based reshaping model such as a neural network with a relatively high dimensional transform without using reshaping functions/mappings explicitly specified or represented with reshaping operational parameters such as operational parameter for polynomial, MMR, or B-spline functions or tensor product of B-spline functions, etc. The ML-based reshaping model may have trained operational parameters such as trained weights/biases of the neural network, and may perform an implicit reshaping mapping on the to-be-reshaped images by way of these trained operational parameter or trained weights/biases of the neural network.

Operational parameters in the relatively high dimensional transform or weights/biases are relatively numerous and can be trained, optimized or generated via supervised or unsupervised learning. After training, the neural network with the relatively high dimensional transform or the relatively numerous trained operational parameters therein can be pre-stored or fixed in codecs such as upstream image/video encoders and/or downstream image/video decoders.

As a result, when the input images are encoded by an upstream image/video encoder, these numerous operational parameters for the neural network or ML-based reshaping model do not need to be included as a part of an output or encoded video signal encoded with the reshaped images by the upstream image/video encoder. When the reshaped images are decoded from the output or encoded video signal by a downstream recipient image/video decoder, the numerous operational parameters for the neural network or ML-based reshaping model are already stored at the downstream recipient image/video decoder to enable the decoder to generate reconstructed images from the reshaped images using the neural network or ML-based reshaping model. In other words, using implicit mapping, a ML reshaping transform or model as described herein for implicit mapping does not require any image metadata to be included in a video signal to signal the transform or model, as the transform or model and/or operational parameters therefor can be pre-stored to enable a codec device to perform image reshaping operations with the transform or model at runtime in an actual deployment or inference stage.

An example of a relatively high dimension transform may be implemented in whole or in part as a convolutional neural network or CNN or a data transform operating (e.g., as one or more data transform layers, etc.) with the CNN. The CNN or layers therein may operate with a relatively high number of output channels (e.g., depending on types of filters used in the CNN to generate the output channels, depending on the total number of pixels in an image to which filters are applied, etc.) and a relatively large number of operational parameters (e.g., weights, biases, number of nodes, number of node/layer inputs, number of node/layer outputs, number of layers, number of strides, types of layers, types of filters, sizes of filter kernels, types of activation functions, etc.) used in the CNN.

Two CNNs or transforms implemented therein or therewith may form a reshaper pair and used respectively in forward and inverse/backward reshaping operations as described herein. One of the two CNNs/transforms is for forward reshaping, whereas the other of the two CNNs/transforms is for backward reshaping. The two CNNs/transforms in the same pair can be trained such that they are reversible. Throughout this specification, the term "inverse reshaping" and "backward reshaping" may be used interchangeably.

As used herein, the term "reversible" may mean that a reconstructed image—identical to or closely approximating an input image—can be generated by using an explicit or implicit backward reshaping mapping to backward reshape a forward reshaped image that was generated by using a corresponding explicit or implicit forward reshaping mapping to forward reshape the input image.

Example embodiments described herein relate to encoding image data. An input image represented in an input domain is received from an input video signal. Forward reshaping is performed on the input image to generate a forward reshaped image represented in a reshaped image domain. Non-reshaping encoding operations are performed to encode the reshaped image into an encoded video signal. At least one of the non-reshaping encoding operations is implemented with an ML model that has been previously trained with training images in one or more training datasets in a preceding training stage. A recipient device of the encoded video signal is caused to generate a reconstructed image from the forward reshaped image. The reconstructed image is used to derive a display image to be rendered on an image display operating with the recipient device.

Example embodiments described herein relate to decoding image data. A forward reshaped image represented in a reshaped image domain is decoded from an encoded video signal. The forward reshaped image was generated by an upstream device by forward reshaping an input image represented in an input image domain. Inverse reshaping and non-reshaping decoding operations are performed on and in connection with the forward reshaped image to generate a reconstructed image represented in a reconstructed image domain. The inverse reshaping and forward reshaping form a reshaping operation pair. At least one of the non-reshaping decoding operations is implemented with an ML model that has been previously trained with training images in one or more training datasets in a preceding training stage. A display image derived from the reconstructed image is caused to be rendered on an image display.

Example Learning Based Image/Video Codec Architectures

ML based or non-ML based reshaping techniques as described herein can be implemented or incorporated into a variety of learning based image/video codec architectures. Some of these architectures support reshaping operations performed in explicit mapping operational modes in which the reshaping operations apply explicitly specified reshaping mappings to input images to generate reshaped images. Some others of the architectures support reshaping operations in which the reshaping operations apply reshaping mappings implicitly—e.g., through ML models comprising (e.g., numerous, non-signaled, prestored, pre-deployed, etc.) optimized operational parameters trained with training images—to input images to generate reshaped images. However, in some operational scenarios, some or all of optimized operational parameters of ML models trained with training images can be signaled in an encoded video signal as described herein, especially when the total number of these parameters or the total data volume to carry these parameters are relatively small (e.g., below a specific data volume threshold, weights/biases signaling overheads are relatively small, etc.).

FIG. 1A illustrates an example codec architecture in which out-of-loop image/video reshapers (or reshaping modules) operate in conjunction with learning based image/video codecs. Some or all of the architecture may be implemented in hardware, software or a combination of hardware and software with computer processors, ASICS, FPGAs, DSPs, ICs, video codec chipsets, etc.

As shown, a forward reshaper is implemented as a preprocessor in relation to (or out-of-loop with respect to) a learning based image/video encoder in an upstream image/video encoding device, whereas a backward reshaper is implemented as a postprocessor in relation to (or out-of-loop with respect to) a learning based image/video decoder in a downstream recipient image/video encoding device.

More specifically, the forward reshaper of the upstream image/video encoding device receives an input (image/video signal) comprising input images and performs out-of-loop reshaping to apply forward reshaping mappings to the input images to generate reshaped images and reshaping image metadata specifying or defining (e.g., backward, etc.) reshaping mappings.

The learning based image/video encoder receives the reshaped images serve as input, performs learning based encoding operations on the reshaped images to generate compressed images and non-reshaping image metadata, and encodes/compresses the compressed images into a compression bitstream. The learning based encoding and decoding operations as illustrated with FIG. 1A may be the same as, or similar to, some or all non-reshaping image/video encoding and decoding operations as illustrated with FIG. 1B or FIG. 1C. Example forward and backward reshaping respectively using forward reshaping metadata parameters (or simply reshaping metadata or reshaping parameters) and backward reshaping metadata parameters (or composer metadata) are described in U.S. Provisional Patent Application Ser. No., 63/013,063, "Reshaping functions for HDR imaging with continuity and reversibility constraints," by G-M. Su, filed on Apr. 21, 2020, and U.S. Provisional Patent Application Ser. No. 63/013,807 "Iterative optimization of reshaping functions in single-layer HDR image codec," by G-M. Su and H. Kadu, filed on Apr. 22, 2020, the contents of which are entirely incorporated herein by reference as if fully set forth herein. Example non-reshaping image/video encoding and decoding operations are described in Guo Lu et al., "*DVC: An End-to-End Deep Video Compression Framework*," Proceedings of the IEEE Conference on Computer Vision and Pattern Recognition (CVPR 2019), which is incorporated herein by reference in its entirety.

The reshaping image metadata generated by the forward reshaper and the non-reshaping image metadata generated by the learning based encoder can be included by the upstream encoding device (e.g., by one or both of the out-of-loop forward reshaper or the in-loop learning-based image/video encoder, etc.) along with the compressed bitstream in an encoded video signal.

The learning based image/video decoder of the downstream image/video decoding device in FIG. 1A receives the encoded video signal and performs learning based decoding operations to decodes/decompresses compressed image data of the encoded video signal into the reshaped images (subject to quantization or coding errors in compression and decompression). The learning based decoding operations as illustrated with FIG. 1A may be the same as, or similar to, some or image/video decoding operations as illustrated with FIG. 1B or FIG. 1C.

Referring to FIG. 1A, the reshaping image metadata generated by the forward reshaper and the non-reshaping image metadata generated by the learning based encoder can be decoded or received by way of the encoded video signal by the downstream encoding device (e.g., by the out-of-loop backward reshaper or the learning-based image/video decoder, etc.).

The backward reshaper receives the (forward) reshaped images as input from the learning-based image/video decoder and performs out-of-loop reshaping to apply backward reshaping mappings as specified in (or derived from) the reshaping image metadata to the reshaped images to generate reconstructed images.

Figure 1B:
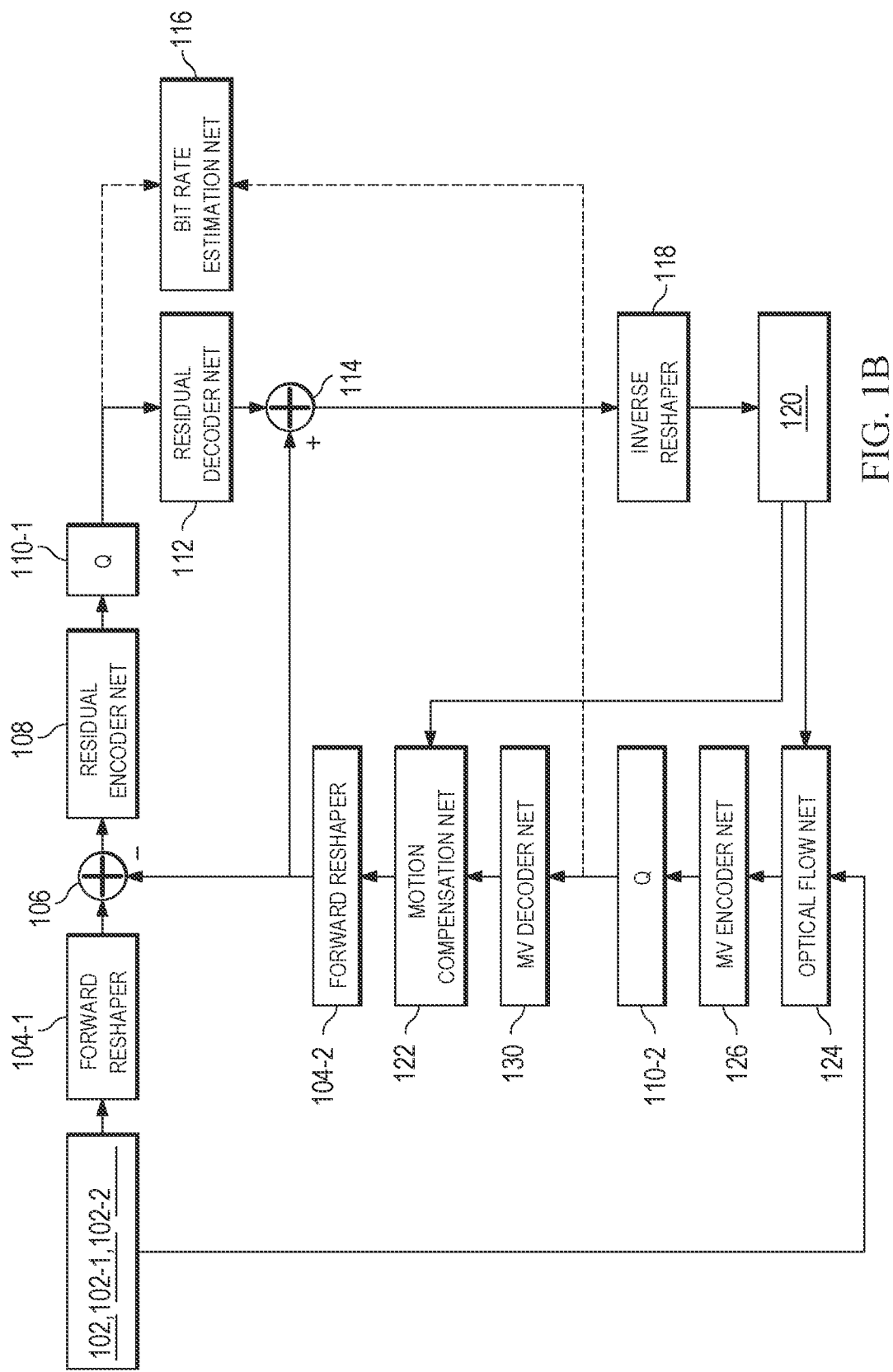

FIG. 1B illustrates a first example codec architecture in which in-loop image/video reshapers (or reshaping modules) operate in conjunction with learning based image/video codecs. Some or all of the architecture may be implemented in hardware, software or a combination of hardware and software with computer processors, ASICS, FPGAs, DSPs, ICs, video codec chipsets, etc.

A learning-based image/video encoder that includes or combines with in-loop (e.g., ML, non-ML, etc.) reshapers may implement some or all modules or operations identified in FIG. 1B.

As shown, a first instance 104-1 of an in-loop forward reshaper receives an input image 102 (e.g., in a sequence of consecutive input images in an input video signal, etc.) and performs in-loop forward reshaping on the input image (102) to generate a corresponding forward reshaped image depicting the same visual semantic content as the input image (102).

A residual generation operation 106 generates a residue forward reshaped image in which a residue forward reshaped pixel or codeword value R at a sample location (x, y) is computed by a mathematic equation $R(x, y) = f(I(x, y), P(x, y))$, where $f( \ldots )$ denotes a residual generation function or operation, $I(x, y)$ denotes the forward reshaped image (from the first instance (104-1) of the in-loop forward reshaper) to the residual generation operation (106) or a forward reshaped codeword at the sample location (x, y) therein, $P(x, y)$ denotes a forward reshaped predicted image (from a second instance 104-2 of the in-loop forward reshaper) to the residual generation operation (106) or a forward reshaped predicted codeword at the sample location (x, y) therein. In a first example in which the residual generation operation (106) is defined or specified with the mathematical equation using a subtraction operation $f(x,y)=I(x,y)-P(x,y)$, the residual image comprises pixel or codeword value differences. In a second example in which the residual generation operation (106) is defined or specified with the mathematical equation using a ratio or division operation $f(x,y)=I(x,y)/P(x,y)$ or vice versa, the residual image comprises pixel or codeword value ratios. In a third example in which the residual generation operation (106) is defined or specified with the mathematical equation using a more general operation $f(x,y)=A*I(x,y)-B*P(x,y)+O$, where A, B, O are configurable values, the residue image comprises pixel or codeword values generated by applying the more general operation to the forward reshaped image and the forward reshaped predicted image outputted by the second instance (104-2) of the in-loop forward reshaper.

A neural network such as a residual encoder net 108 may apply a residual encoding operation on the residual forward reshaped image to generate a residual encoded forward reshaped image.

A first instance 110-1 of a (e.g., linear, non-linear, perceptual, non-perceptual, etc.) quantizer is applied to the residual encoded forward reshaped image to generating quantized residual encoded forward reshaped image data.

A neural network such as a residual decoder net 112 may apply a residual decoding operation on the quantized residual encoded forward reshaped image data to generate a reconstructed residual forward reshaped image.

The residual encoder net (108) and the residual decoder net (112) form a residual coding network that can encode and decode residual image data (which may contain different value ranges or distributions as compared with non-residual image data) relatively efficiently with relatively small quantization errors.

An image generation operation 114 generates a reconstructed forward reshaped image in which a reconstructed forward reshaped pixel or codeword value Q at a sample location (x, y) is computed by a second mathematic equation $Q(x, y)=g(R(x, y), P(x, y))$, where $g( \ldots )$ denotes the image generation operation, which may be an inverse operation to the residual generation function or operation (106). In a first example in which the image generation operation (114) is defined or specified with the second mathematical equation using an addition operation $g(x,y)=R(x,y)+P(x,y)$, the reconstructed image comprises pixel or codeword value sums of the residual and predicted pixel or codeword values. In a second example in which the image generation operation (114) is defined or specified with the second mathematical equation using a multiplication operation $g(x,y)=R(x,y)*P(x,y)$ or vice versa, the reconstructed image comprises pixel or codeword value products of the residual and predicted pixel or codeword values. In a third example in which the image generation operation (114) is defined or specified with the second mathematical equation using a second more general operation that is a mathematical inverse of the previously mentioned $f(x,y)=A*I(x,y)-B*P(x,y)+O$, the reconstructed image comprises pixel or codeword values generated by applying the second more general operation to the forward reshaped image and the residual forward reshaped image.

An in-loop backward or inverse reshaper 118 performs in-loop backward (or inverse) reshaping on the reconstructed forward reshaped image outputted by the image generation operation (114) to generate a corresponding reconstructed image—which is an inverse or backward reshaped image—depicting or closely approximating the same visual semantic content as the input image (102).

As illustrated in FIG. 1B, the reconstructed image is generated with in-loop forward and backward reshaping mappings/operations performed by the forward reshaper(s) (104) and the inverse reshaper (118) as well as non-reshaping operations other than the in-loop forward and backward reshaping mappings/operations.

The reconstructed image can be (e.g., uniquely within all the buffered reference images, etc.) identified with a distinct reference image index value, stored in a reference image buffer 120, and subsequently used to generate motion information for the next input image following the input image (102).

By way of illustration but not limitation, a neural network such as an optical flow net 124 receives the input image (102) and one or more reference images, each of which is a reconstructed image retrieved from the reference image buffer (120). These reference images respectively correspond to zero, one or more specific frame indices representing one or more specific time instances of a playback time covered by the sequence of consecutive input images in the input video signal, etc., and had been generated from previously processed input images and stored in the reference image buffer (120) before the reconstructed image for the input image (102) was generated. The optical flow net (124) (e.g., a specific optical flow CNN, etc.) proceeds to use the input image (102) and the reference images to generate (raw) optical flow information detected in these images.

A neural network such as a MV (motion vector) encoder net 126 may apply an MV encoding operation on the detected optical flow information in the input image (102) and the retrieved reference images to generate MV encoded information.

A second instance 110-2 of the (e.g., linear, non-linear, perceptual, non-perceptual, etc.) quantizer is applied to the MV encoded information to generating quantized MV encoded information.

A neural network such as an MV decoder net 130 may apply an MV decoding operation on the quantized MV encoded information to generate reconstructed MV information.

The MV encoder net (126) and the MV decoder net (130) form a MV information coding network that can encode and decode MV information (which may contain different value ranges or distributions as compared with non-MV data) relatively efficiently with relatively small quantization errors.

A neural network such as a motion compensation net 122 may use the reconstructed MV information to perform motion compensation operations on image data in one or more reference images—which may be the same as the reference images used to determine the MV information—to generate a motion compensated image which represents a predicted image for the next input image following the input image (102). The motion compensated image generated by the motion compensation net (122) may be forward reshaped by the second instance (104-2) of the forward reshaper into a (or the next) forward reshaped predicted image for the next input image.

In a training stages, operations including but not limited to the in-loop forward and backward reshaping mappings/operations or operational parameters used therein can be optimized with a bitrate estimation net 116—e.g., a ML based bit rate estimation model, an artificial neural network or ANN based bit rate estimation model, etc.—to minimize one or both of (a) differences between a reconstructed image and a corresponding input image giving rise to the reconstructed image; and/or (b) bit rates used to transmit an encoded (training) video signal encoded with a representation of the corresponding input image (or the training image). The input image in the training stage may be a training image—e.g., in a training sequence of consecutive training images from a training data set. The representation of the input image (or the training image) encoded in the (training) encoded video signal may include the quantized residual forward reshaped image and motion information derived from (training) reference images derived from training images and stored in the reference image buffer (120).

In some operational scenarios, the bitrate estimation net (116) (e.g., a specific bitrate estimation CNN, etc.) uses corresponding quantized residual encoded forward reshaped image data generated from the first instance (110-1) of the quantization operation and corresponding quantized MV information generated from the second instance (110-2) of the quantization operation as some or all input to estimate (a) the differences between the reconstructed image and the corresponding input image; and/or (b) the bit rates used to transmit an encoded (training) video signal encoded with the representation of the input image (or the training image).

Additionally, optionally or alternatively, for the purpose of optimizing the reshaping and non-reshaping operations in the learning-based image/video encoder or operational parameters used therein, the bitrate estimation net (116) may use other (training) image data such as input, output and/or intermediate image data generated by the learning-based image/video encoder and/or (training) image metadata such as MV information and non-MV information, in addition to or in place of quantized residual encoded forward reshaped image data generated from the first instance (110-1) of the quantization operation and quantized MV information generated from the second instance (110-2) of the quantization operation.

In some operational scenarios, a learning-based image/video encoder (or an upstream encoding device) in the inference or actual deployment stage (after the training stage) can be implemented to incorporate some or all components and data flows of the codec architecture of FIG. 1B, with the bitrate estimation net (116) and associated data flows used for training purposes removed.

In some operational scenarios, a learning-based image/video decoder (or a downstream recipient decoding device) in the inference or actual deployment stage can be implemented to incorporate some or all components and data flows of the codec architecture of FIG. 1B, with the bitrate estimation net (116) and associated data flows used for training purposes removed, with encoding-specific image processing blocks/instances/components such as (104-1), (106), (108), (110-1), (124), (126) and (110-2) removed, and with encoding-specific data flow removed/adapted to decoding operations.

More specifically, as illustrated in FIG. 1B, instead of receiving the input image (102) as input, the (downstream recipient) learning-based image/video decoder receives quantized residual encoded forward reshaped image data 102-1 from the encoded video signal outputted by the (upstream) learning-based image/video encoder. The quantized residual encoded forward reshaped image data (102-1) was generated from the input image (102) and encoded into the encoded video signal by the (upstream) learning-based image/video encoder or the first instance (110-1) of the quantizer therein.

In addition, as illustrated in FIG. 1B, instead of generating quantized MV encoded information using the processing blocks (124), (126) and (110), the (downstream recipient) learning-based image/video decoder receives quantized MV encoded information 102-2 from the encoded video signal outputted by the (upstream) learning-based image/video encoder. The quantized MV encoded information (102-2) was generated from the input image (102) in combination with one or more reference images, and encoded into the encoded video signal by the (upstream) learning-based image/video encoder or the second instance (110-2) of the quantizer therein.

Figure 1C:
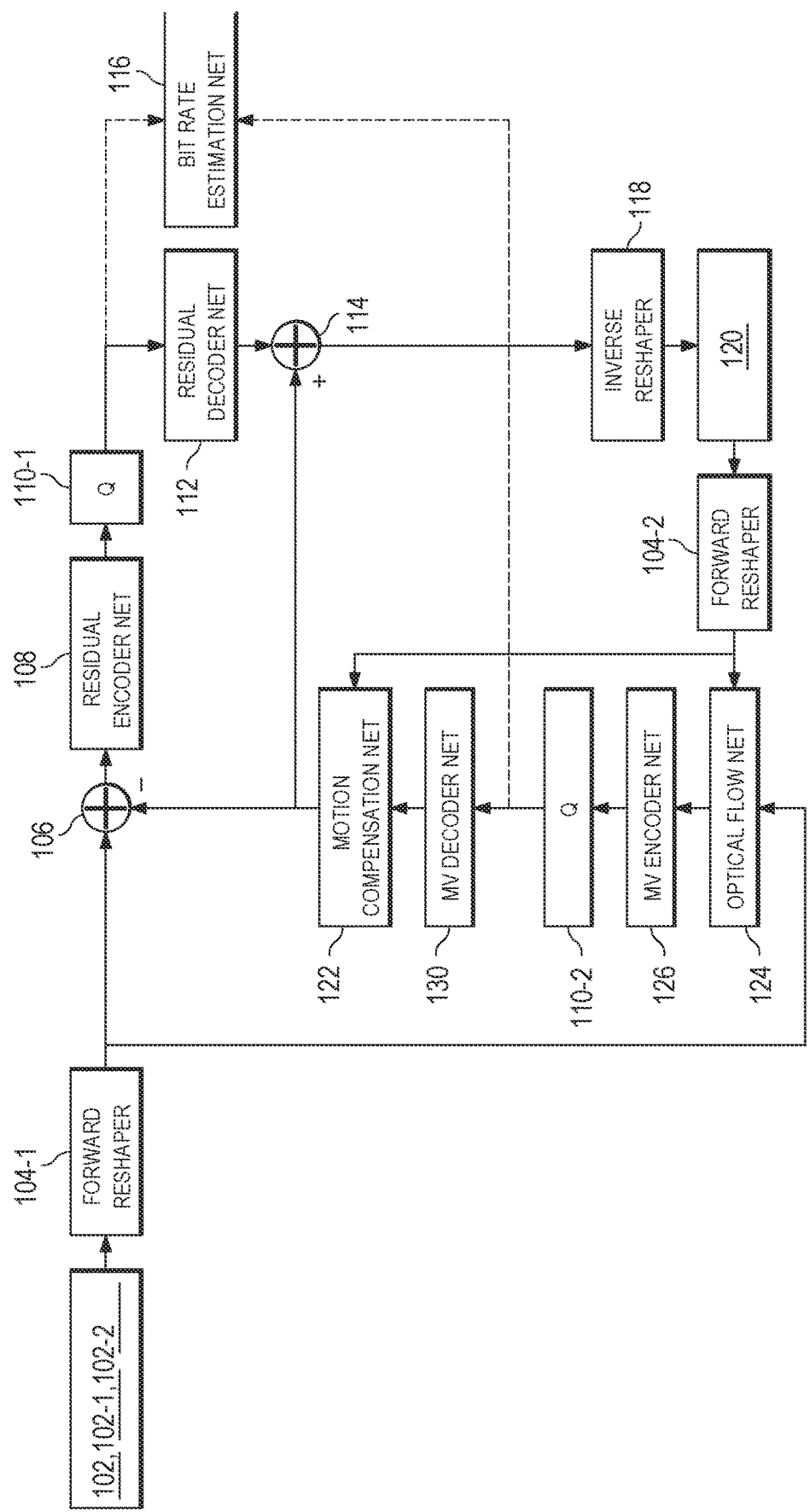

FIG. 1C illustrates a second example codec architecture in which in-loop image/video reshapers (or reshaping modules) operate in conjunction with learning based image/video codecs. Some or all of the architecture may be implemented in hardware, software or a combination of hardware and software with computer processors, ASICS, FPGAs, DSPs, ICs, video codec chipsets, etc.

A learning-based image/video encoder that includes or combines with in-loop (e.g., ML, non-ML, etc.) reshapers may implement some or all modules or operations identified in FIG. 1B.

As shown, as compared with the first example architecture of FIG. 1B, the second example architecture of FIG. 1C includes a number of modifications or differences. More specifically—instead of using the input image (102) from the input video signal and reference images from the reference image buffer (120) to perform optical flow analysis with the optical flow net (124) in FIG. 1B—the optical flow net (124) in FIG. IC uses the forwarded reshaped image generated by the first instance (104-1) of the in-loop forward reshaper from forward reshaping the input image (102) and forward reshaped reference images generated by the second instance (104-2) of the in-loop forward reshaper from forward reshaping the reference images to perform optical flow analysis to generate (raw) optical flow information.

Also—instead of using the forward reshaped image generated from forward reshaping the input image (102) and the forward reshaped predicted image outputted by the second instance (104-2) of the in-loop forward reshaper as input to the residual generation operation (106) in FIG. 1B—the residual generation operation (106) in FIG. 1C uses the forwarded reshaped image generated by the first instance (104-1) of the in-loop forward reshaper from forward reshaping the input image (102) and a forward reshaped predicted image generated by the motion compensation net (122) to perform optical flow analysis to generate a residual forward reshaped image.

Furthermore—instead of first using the motion compensation net (122) to construct a motion compensated image or a predicted image by performing motion compensation operations on image data in one or more reference images based on reconstructed MV information and then using the second instance (104-2) of the forward reshaper to generate a forward reshaped predicted image from the motion compensated image or the predicted image as illustrated in FIG. 1B—the second example codec architecture as illustrated in FIG. 1C first uses the second instance (104-2) of the forward reshaper to generate one or more forward reshaped reference images, and then uses the motion compensation net (122) to construct a forward reshaped motion compensated image or a forward reshaped predicted image by performing motion compensation operations on image data in the one or more forward reshaped reference images based on reconstructed MV information.

Similar to the bitrate estimation net (116) of FIG. 1B, in some operational scenarios, the bitrate estimation net (116) (e.g., a specific bitrate estimation CNN, etc.) of FIG. IC uses corresponding quantized residual encoded forward reshaped image data generated from the first instance (110-1) of the quantization operation and corresponding quantized MV information generated from the second instance (110-2) of the quantization operation as some or all input to estimate (a) the differences between the reconstructed image and the corresponding input image; and/or (b) the bit rates used to transmit an encoded (training) video signal encoded with the representation of the input image (or the training image).

Additionally, optionally or alternatively, for the purpose of optimizing the reshaping and non-reshaping operations in the learning-based image/video encoder or operational parameters used therein, the bitrate estimation net (116) of FIG. 1C may use other (training) image data such as input, output and/or intermediate image data generated by the learning-based image/video encoder and/or (training) image metadata such as MV information and non-MV information, in addition to or in place of quantized residual encoded forward reshaped image data generated from the first instance (110-1) of the quantization operation and quantized MV information generated from the second instance (110-2) of the quantization operation.

In some operational scenarios, a learning-based image/video encoder (or an upstream encoding device) in the inference or actual deployment stage (after the training stage) can be implemented to incorporate some or all components and data flows of the codec architecture of FIG. 1C, with the bitrate estimation net (116) and associated data flows used for training purposes removed.

In some operational scenarios, a learning-based image/video decoder (or a downstream recipient decoding device) in the inference or actual deployment stage can be implemented to incorporate some or all components and data flows of the codec architecture of FIG. 1C, with the bitrate estimation net (116) and associated data flows used for training purposes removed, with encoding-specific image processing blocks/instances/components such as (104-1), (106), (108), (110-1), (124), (126) and (110-2) removed, and with encoding-specific data flow removed/adapted to decoding operations.

More specifically, as illustrated in FIG. 1C, instead of receiving the input image (102) as input, the (downstream recipient) learning-based image/video decoder receives quantized residual encoded forward reshaped image data 102-1 from the encoded video signal outputted by the (upstream) learning-based image/video encoder. The quantized residual encoded forward reshaped image data (102-1) was generated from the input image (102) and encoded into the encoded video signal by the (upstream) learning-based image/video encoder or the first instance (110-1) of the quantizer therein.

In addition, as illustrated in FIG. 1C, instead of generating quantized MV encoded information using the processing blocks (124), (126) and (110), the (downstream recipient) learning-based image/video decoder receives quantized MV encoded information 102-2 from the encoded video signal outputted by the (upstream) learning-based image/video encoder. The quantized MV encoded information (102-2) was generated from a forward reshaped image—which was in turn generated by forward reshaping the input image (102) at the encoder side—in combination with one or more forward reshaped reference images, and encoded into the encoded video signal by the (upstream) learning-based image/video encoder or the second instance (110-2) of the quantizer therein.

In the codec architecture as illustrated in FIG. 1B, motion estimation and motion compensation are performed in an original (picture) domain (or a codeword space in which input images are encoded or represented) or with respect to input and reference images to which forward reshaping is yet to apply. In contrast, in the codec architecture as illustrated in FIG. 1C, motion estimation and motion compensation are performed in a forward reshaped (picture) domain (or a codeword space in which forward reshaped images are encoded or represented).

Global Reshaping and Image Adaptive Reshaping

Figure 2A:
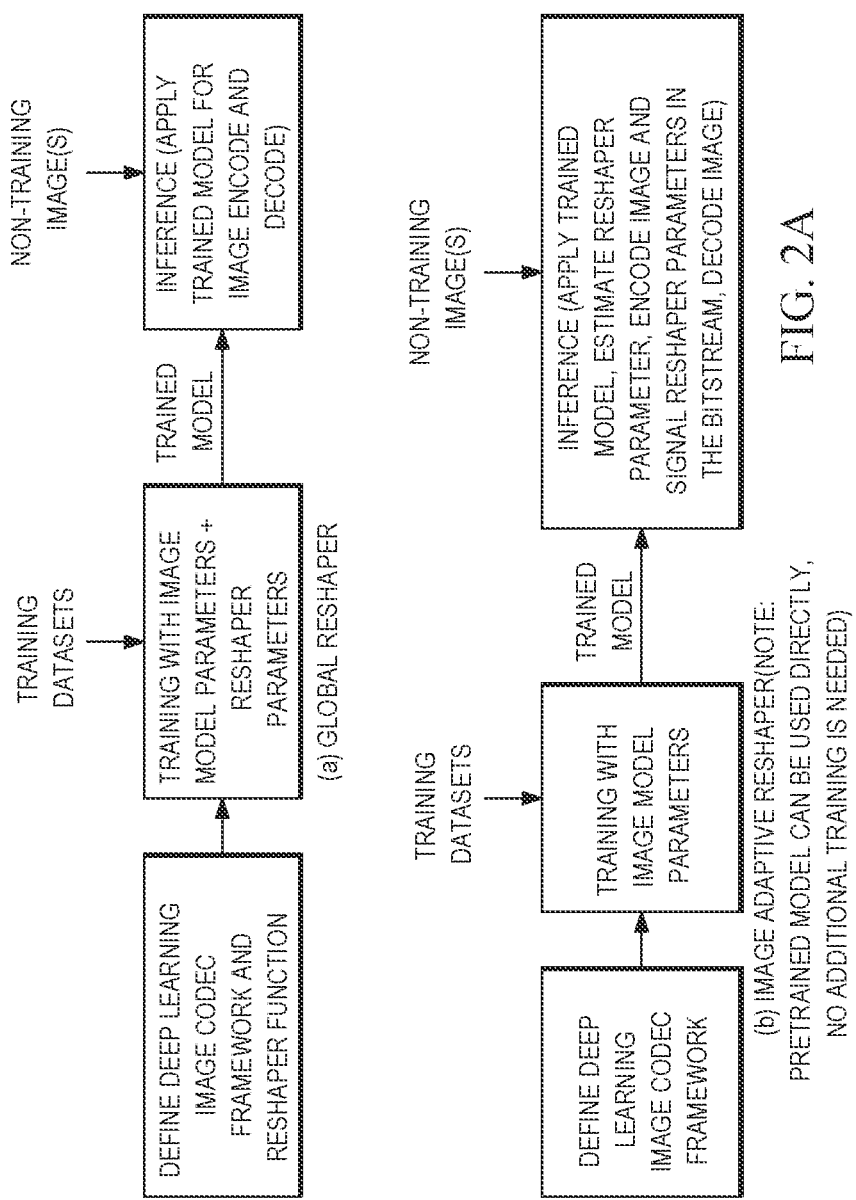
FIG. 2A illustrates example workflows in which reshaping operations can be performed.

FIG. 2A illustrates two example workflows (e.g., process flow, approach, etc.) in which reshaping operations can be performed. The first workflow or approach as shown in FIG. 2A (a) may be used to perform global reshaping. The second workflow or approach as shown in FIG. 2A (b) may be used to perform image/picture adaptive reshaping operations.

In the first workflow/approach of FIG. 2A (a), operational parameters such as weights and biases in neural networks implementing a (deep) learning-based codec framework/architecture (e.g., in FIG. 1A or FIG. 1B, etc.) can be defined first. These operational parameters may be optimized, learned and used in reshaping operations (e.g., performed by forward and inverse reshapers, etc.) as well as non-reshaping operations (e.g., motion estimation, motion compensation, non-linear encoder-decoder quantization networks, etc.). For example, these operational parameters may include a subset of operational parameters—which may be referred to as reshaper or reshaping parameters—that explicitly or implicitly specify reshaping functions/mappings to be applied or used in the forward and inverse reshapers or reshaping operations. The remainder of the operational parameters in the learning-based codec framework/architecture—which may be referred to as image model parameters or non-reshaping operations—may include, but are not necessarily limited to only, non-reshaping ML model parameters, operational parameters used to specify ANNs (e.g., CNNs, etc.), and so on.

In the model training stage, the non-reshaping and reshaping model parameters can be trained together using training images in training dataset(s) to yield an overall trained model for both reshaping operations and non-reshaping operations.

In the model inference or deployment stage (denoted as "inference" in FIG. 2A), non-training image(s) can be encoded or decoded at runtime using the overall trained model that contains all the trained operational parameters for both the reshaping operations and non-reshaping operations. In some operational scenarios, some or all of the trained operational parameters—e.g., explicitly or implicitly specifying (1) the reshaping mappings/functions applied by the reshapers or reshaping operations and (2) operational parameters used in non-reshaping operations—to be used by a codec (e.g., encoder, decoder, transcoder, etc.) implementing the learning-based codec framework/architecture can be prestored at the codec, before the non-training image(s) such as input or forward reshaped images are received by the codec to encode or decode at the runtime. The trained model with trained operational parameters for both the reshaping and non-reshaping operations can be applied to encode and decode these non-training image(s). In some operational scenarios, the decoder has already been prestored with the trained operational parameters. Hence, no additional video signal coding syntax parameters identifying individual reshaping mappings/functions for individual images need to be sent within an encoded video signal encoded with the individual images in these operational scenarios.

In the second workflow/approach of FIG. 2A (b), operational parameters such as weights and biases in neural networks used to perform non-reshaping operations (e.g., motion estimation, motion compensation, non-linear encoder-decoder quantization networks, etc.) in a (deep) learning-based codec framework/architecture (e.g., in FIG. 1A or FIG. 1B, etc.) can be defined first. These operational parameters—which may be referred to as image model or non-reshaping parameters—may include, but are not necessarily limited to only, non-reshaping ML model parameters, operational parameters used to specify ANNs (e.g., CNNs, etc.), and so on.

In the model training stage, the image model parameters can be trained using training images in training dataset(s) to yield a trained model for the non-reshaping operations.

In the model inference or deployment stage, non-training image(s) can be encoded or decoded at runtime using the trained model that contains the trained operational parameters for the non-reshaping operations. In some operational scenarios, some or all of the trained operational parameters to be used by a codec (e.g., encoder, decoder, transcoder, etc.) implementing the non-reshaping operations in the learning-based codec framework/architecture can be pre-stored at the codec, before the non-training image(s) are received by the codec to encode or decode at the runtime. The trained model with trained operational parameters for the non-reshaping operations can be applied to encode and decode non-training image(s). In these operational scenarios, no additional video signal coding syntax parameters for the operational parameters used in the non-reshaping operations need to be sent within an encoded video signal encoded with compressed image(s) corresponding to the non-training image(s) to decoder at the runtime, as the decoder has already been prestored with the trained operational parameters.

Image or picture adaptive reshapers or reshaping operations may be implemented or supported in a workflow/approach including but not necessarily limited to the second workflow/approach. For example, as illustrated in FIG. 2A (b), the trained model for the non-reshaping operations may not contain trained operational or reshaping parameters related to the reshapers or reshaping operations. In the inference or deployment stage, at the encoder side, operational parameters (or reshaping parameters) specifying image specific reshaping mappings/functions for the reshapers or reshaping operations can be estimated or generated at runtime when non-training image(s) are received and encoded into an encoded video signal (e.g., a coded bitstream, etc.). These reshaping parameters can be included in the encoded video signal and signaled to downstream recipient decoder(s). The reshaping parameters may be used by the decoders to derive the image specific reshaping mappings/functions used in the reshapers or reshaping operations.

By way of comparison, in the first workflow/approach, the subset of operational parameters (or reshaper parameters) for the reshapers or reshaping operations is trained or optimized—along with the operational parameters for non-reshaping operations in the overall model—using all the training images from the training set(s). Hence, if the non-training image(s) have different characteristics from the training images, the reshapers or reshaping operations may be suboptimal in achieving coding efficiency as compared with images with the same characteristics as the training images.

On the other hand, in the second workflow/approach, the reshaper parameters may be adaptively (e.g., dynamically, based on actual codewords or pixel values or their distributions in a pre-reshaped image, etc.) estimated based on the characteristics of each of the non-training image(s). Hence, even where the training images in the training dataset(s) have different characteristics from the non-training image(s), the reshaper or reshaping operations can be implemented or applied to modify or reshape the non-training image(s) to reshaped images that better fit the trained model than the non-training image(s). As a result, better coding efficiency may be achieved or improved as compared with the first workflow/approach in which an overall model is pre-trained with the training images of different characteristics from the non-training image(s).

The reshaping operations may be used to achieve coding efficiency, such as minimize bitrates used to carry or encode images, enhance reversibility of mappings between input images and reshaped images and between reshaped images and reconstructed images, reduce quantization/coding errors, allow other image processing operations to further adapt forward reshaped images or reconstructed images to support various image displays, etc.

In some operational scenarios, reshaping operations as described herein can be used to perform HDR to SDR conversion or vice versa. However, the reshaped images or reconstructed images of HDR or SDR may or may not be optimized for watching one some image displays without further display adaptation. In these operational scenarios, the reshaping operations can be implemented to perform in conjunction with other image processing operations including but not limited to those related to target display adaptation. For example, display management (DM) operations may be performed by a recipient device as described herein to adapt reconstructed images into display images to be rendered on an image display. The DM operations may be based on DM metadata that is included as a part of image metadata carried in an encoded video signal. This is for coding efficiency purposes.

A tradeoff is that additional signaling overhead and encoder complexity may be incurred in the second workflow/approach that implements image or picture adaptive reshapers or reshaping operations.

In some operational scenarios, a forward reshaper performing forward reshaping operations and an inverse/backward reshaper performing inverse/backward reshaping operations—such as those depicted in FIG. 1A, FIG. 1B or FIG. 1C—form a reshaper pair. The forward reshaper performs the forward reshaping operations to map codewords or pixel values from an original sample domain to a mapped sampled domain, whereas the inverse/backward reshaper performs the inverse/backward reshaping operations to map mapped codewords or mapped pixel values from the mapped sample domain back to the original sample domain.

Operational parameters (or reshaper parameters) for the reshaping operations are used differently in the inference or deployment stage, depend on an implemented codec architecture.

In operational scenarios as illustrated in FIG. 1A, (e.g., only, etc.) a forward reshaper is used at the encoder side, whereas (e.g., only, etc.) an inverse/backward reshaper is used at the decoder side. Operational parameters for forward reshaping operations are used at the encoder side for the forward reshaper to drive or perform the forward reshaping operations. Likewise, operational parameters for inverse/backward reshaping operations are used at the decoder side for the inverse/backward reshaper to drive or perform the inverse/backward reshaping operations.

In operational scenarios as illustrated in FIG. 1B or FIG. 1C, both forward and inverse/backward reshapers are used in the inference or deployment stage at each of the encoder side or the decoder side. Operational parameters for both forward and inverse/backward reshaping operations are used at each of the encoder side or the decoder side for the forward and inverse/backward reshapers to drive or perform the forward and inverse/backward reshaping operations.

In operational scenarios as illustrated in FIG. 2A (a), operational parameters (reshaping parameters) used in global reshaping operations can be defined and trained along with operational parameters (non-reshaping parameters) for non-reshaping operations in an overall model. These operational parameters may be prestored, preconfigured or fixed at a decoder at runtime.

In the training stage, both the reshaping parameters and non-reshaping parameters can be optimized or trained using some or all of the same training images in the same training dataset(s). The reshaping parameters may include forward reshaping parameters used in forward reshaping operations and inverse/backward reshaping parameters used in inverse/backward reshaping operations.

In the inference or deployment stage (for real use applications), the overall model can be split into an encoder model and a decoder model. Accordingly, the reshaping parameters may be split or partitioned into the forward reshaping parameters and the inverse/backward reshaping parameters. As the encoder model may only perform the forward reshaping operations, only the forward reshaping parameters may be used or stored at the encoder model. As the decoder model may only perform the inverse/backward reshaping operations, only the inverse/backward reshaping parameters may be used or stored at the decoder model.

In addition, as the decoder model including decoder used reshaping parameters (e.g., inverse/backward reshaping parameters, etc.) can be stored or prestored at a decoder to support global reshaping operations before an encoded video signal encoded with forward reshaped images is received, no additional reshaping parameters (other than those stored or prestored at the decoder) may need to be sent or included in the encoded video signal.

In contrast, for a codec architecture used to perform image/picture adaptive reshaping operations, as reshaping parameters are adaptively decided for each individual image, these reshaping parameters may need to be sent or included in the encoded video signal.

As illustrated in FIG. 1B or FIG. 1C, non-reshaping operations in a coding pipeline of a learning-based image/video encoder or decoder may be implemented or performed with loop filters or in-loop filterers some or all of which may be ML models such as neural networks. For example, some neural networks—such as the optical flow net (124), the MV encoder net (126), the MV decoder net (130), the motion compensation net (122), etc.—in the coding pipeline may be trained to generate or predict motion compensated images. Some neural networks—such as the residual encoder net (108), the residual decoder net (112), etc.—in the coding pipeline may be trained to generate or predict residual images. The neural networks that generate or predict the motion compensated images complement—rather than serve as inverse or reverse operations to—the neural networks that generate or predict residual images. In other words, the predicted motion compensated images complement—rather than serve as inverse to—the predicted residual images in a common image/picture domain (e.g., a reshaped image/picture domain, a non-reshaped image/picture domain, etc.).

In contrast to the non-reshaping operations, forward reshaping operations in the coding pipeline improve coding efficiencies by transforming or reshaping pre-reshaped images into forward reshaped images in a reshaped image/picture domain from an original image/picture domain. Backward reshaping operations in the coding pipeline operate with an encoded video signal for which coding efficiency has been improved or enhanced by the reshaping operations and generate reconstructed images in a reconstructed image/picture domain by backward reshaping the forward reshaped images. In some operational scenarios, the reconstructed image/picture domain is the same as the original image/picture domain. Hence, the backward reshaping functions (e.g., logically, mathematically, etc.) serve as inverse or reverse to—and form a reshaper pair with—the forward reshaping operations.

As noted, image/video reshaping in learning based image/video coding can be implemented or performed via explicit mapping (or parametric mapping) or implicit mapping (non-parametric mapping). The reshaping mappings/functions are explicit when some or all operational parameters specifying the reshaping mappings/functions are generated, estimated and/or signaled in the encoded video signal from an upstream encoding device to a downstream recipient decoding device. The reshaping mappings/functions are implicit when some or all operational parameters specifying the reshaping mappings/functions are implied in ML models such as neural networks and may or may not be signaled in the encoded video signal from an upstream encoding device to a downstream recipient decoding device.

In operational scenarios in which reshaping operations are implemented or performed with neural networks. These neural networks can use relatively small total numbers of layers, relatively simple neural network building blocks, relatively few neural network parameters (e.g., model parameters, operational parameters for the neural networks, etc.), as compared with neural networks used to implement or perform non-reshaping operations. For example, in some operational scenarios, while the neural networks for the non-reshaping operations may use neural network building blocks such as resBlock/resNet, the neural networks for the reshaping operations may not use such relatively complicated neural network building blocks and may be free of resBlock/resNet building blocks. The neural networks for the reshaping operations may not need to perform objective image analysis on motions depicted in images with relatively large total numbers of layers, relatively complicated neural network filters, etc. As result, a neural network for reshaping operations can achieve signal transform or reshaping images with structures and building blocks shallower and simpler than neural network implementing loop or in-loop filtering or other non-reshaping operations in the coding pipeline.

Example reshaping operations performed with neural networks are described in U.S. Patent Application Publication No. 2021/0150812, by Guan-Ming Su et al., filed on 20 May 2021; PCT/US2021/018407, by Guan-Ming Su, filed 27 Feb. 2021, the entire contents of which are hereby incorporated by reference as if fully set forth herein.

Example Image Adaptive Reshaping Methods

For image/picture adaptive reshapers or reshaping operations, various methods can be applied under techniques as described herein at the encoder side to generate or estimate operational parameters (or reshaping parameters) that specify image specific reshaping mapping/function for reshaping operations.

Figure 2B:
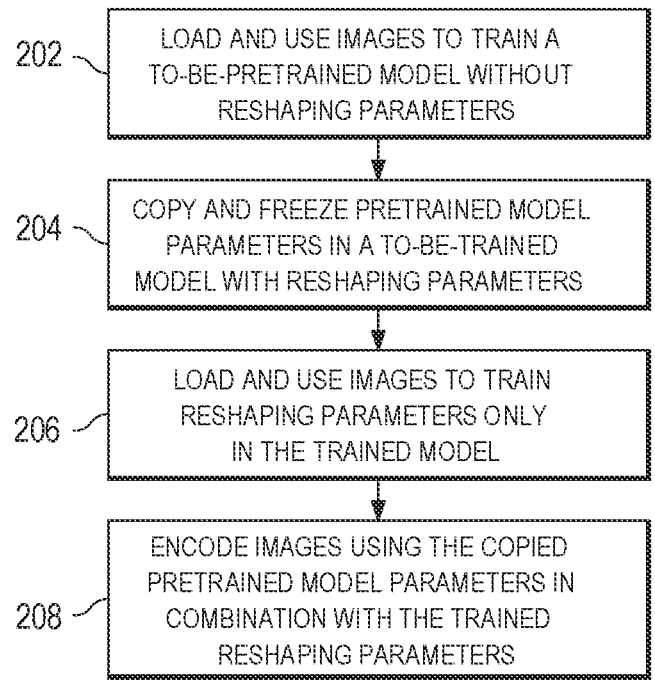
FIG. 2B illustrates an example process flow for training reshaping and non-reshaping ML-based models.

In some operational scenarios, in an example process flow as illustrated in FIG. 2B, block 202 comprises, in a training or learning stage, loading and using training images in training dataset(s) to train or optimize a to-be-pre-trained model (or model parameters therein) into a pre-trained model for encoding operations without learned reshaping parameters. In the training or learning stage, the pretrained model or to-be-pre-trained model may be used to perform only non-reshaping operations, or alternatively performing reshaping operations with initial, default or static reshaping mappings.

Block 204 comprises copying learned model parameters for the pre-trained model into a to-be-trained model specified with to-be-trained reshaping parameters. The copied learned model parameters from the pre-trained model may be frozen in further training.

Block 206 comprises loading and using training images (which may or may not be identical to the training images used in block 202 or which can just be the image to be encoded in block 208) in training dataset(s) to train or optimize the to-be-trained reshaping parameters only-without further training or optimizing the copied and now frozen learned model parameters from the pre-trained model—in the to-be-trained model into trained reshaping parameters in a trained model.

Block 208 comprises, in a testing, inference or deployment stage, encoding (e.g., non-training, input, etc.) images using both the copied learned pre-trained model parameters as well as learned reshaping parameters from the trained model.

As shown in the process flow of FIG. 2A, similar to model fine tuning, the trained model that includes reshaping operations does not have to be trained from ground up. Rather, the trained model can make use of trained model parameters for non-reshaping operations in the pre-trained model.

Additionally, optionally or alternatively, in some operational scenarios, the reshaping parameters can be relatively efficiently (e.g., using a relatively few iterations or data points, etc.) learned, adjusted, calculated or converged using a gradient decent method such as iterative stochastic gradient method. For example, neural network operational parameters such as weights/biases in neural networks used for reshaping operations may be updated iteratively and relatively frequently via back propagation using an iterative stochastic gradient method that minimizes errors or costs as measured by a rate-distortion error/cost function.

The trained model that includes the learned reshaping parameters and learned non-reshaping parameters can be used to generate (e.g., runtime, dynamic, image adaptive, etc.) operational parameters that (e.g., explicitly, in whole or in part, etc.) specify reshaping functions/mappings specifically optimized for individual input images depending on actual codewords or distributions thereof in the individual input images. These reshaping functions/mappings can be used to perform reshaping operations in connection with the input images.

Additionally, optionally or alternatively, some or all of these runtime generated operational parameters that (e.g., explicitly, etc.) define the reshaping functions/mappings or equivalent/approximating curves or lookup tables can be included as reshaping metadata as a part of overall image metadata carried in an encoded video signal encoded with reshaped images to enable recipient devices to perform reshaping operations as appropriate in generating reconstructed images.

In some operational scenarios, an exhaustive search may be implemented or performed to select (e.g., the best, etc.) a specific (e.g., forward, inverse or backward, etc.) reshaping function/mapping for reshaping an image (e.g., an input image, a forward reshaped image, etc.) from among a plurality of candidate reshaping functions/mappings. Each of the candidate reshaping functions/mappings may be a curve such as a multi-piece polynomial (e.g., multiple piecewise linear or 1st order line segments, multiple piecewise 2nd order polynomial segments, etc.) used by a luma mapping (LM) module implementing image processing operations in compliance with an applicable video coding specification such as the Versatile Video Coding (VVC) specification. Operational parameters used to specify or define each of some or all of these candidate reshaping functions/mappings/curves can be pre-built, pre-configured, dynamically determined, etc.

A candidate reshaping function/mapping may be identified, labeled or otherwise represented by a specific parameter set, combination or pair of two parameters respectively denoted as "ADP" and "CW". The ADP parameters may be used to identify or represent a slice type and an option/setting for (e.g., high, etc.) bitrate (adaptation). The parameter CW may be used to identify or represent the total number of (e.g., valid, non-reserved, non-clipped etc.) codewords assigned for all pieces in a multi-piece polynomial reshaping function to cover.

By way of illustration but limitation, for image slices of all intra (AI) coding, the parameter ADP can be set as 0 or 1, where ADP equaling zero (0) indicates that a corresponding (image-adaptive) reshaping function/mapping/curve is applied for all quantization parameter (QP) values, and where ADP equaling one (1) indicates that the reshaping function/mapping/curve is applied for a first QP value range (e.g., QP>22, a designated normal QP range, etc.) and that a static reshaping function/mapping/curve is applied for a second QP value range (e.g., a designated low QP range, QP<=22, etc.). While the static reshaping function/mapping/curve may be selected based on images or codewords/distributions therein, operational parameters specifying the static reshaping function/mapping/curve may be fixed, predetermined, pre-configured, or non-image-adaptive.

The parameter CW representing the total number of codewords for the image-adaptive reshaping function/mapping/curve to cover can be dependent on bit depth of a codeword space comprising available codewords (e.g., for a luma channel/component of a color space, for a chroma channel/component of a color space, for R. G or B in an RGB color space, etc.) to encode or represent the reshaped image. Example value ranges for the parameter CW may, but are not necessarily limited to only, any of: a relative value range of [8, 511] for each piece of a multi-piece polynomial, some or all possible 8-bit values, some or all possible 10-bit values (e.g., 896, 980, etc), and so forth. To reduce or restrict the total number of candidate reshaping functions/mappings/curves in the exhaustive search, in some operational scenarios, a value for the parameter CW may be selected from one among a plurality of values such as {1022, 980, 952, 924, 896, 868, 840, 812}.

Hence, in the present example of AI coding, there are totally 2 (for ADP)*8 (for CW)=16 variations of candidate reshaping functions/mappings/curves, which may be respectively denoted as $\{ADP_i, CW_i\}$, where i=0, 1, . . . , 15.

A rate-distortion optimization (RDO) method can be applied to an image to compute errors/costs in connection with reshaping the image with some or all of these candidate reshaping functions/mappings/curves and identify/determine a specific reshaping mapping/function/curve by selecting the (e.g., optimal, the best, with the minimal error/cost, etc.) candidate reshaping function/mapping/curve among some or all of these 16 variations/candidates. An example RDO cost function may be defined in a Lagrangian rate-distortion function as follows:

$$J = D + \lambda R \qquad (1)$$

The RDO errors/costs can be estimated or evaluated in whole or in part using any, some or all distortion models including but not limited to: the sum of squared differences (SSD), mean squared error (MSE), peak signal-to-noise ratio (PSNR), and so on. Additionally, optionally or alternatively, the RDO errors/costs can be estimated or evaluated in whole or in part using any, some or all perception-based models including but not limited to: structural similarity index (SSIM), feature similarity index (FSIM), visual information fidelity (VIF), additive distortion metric (ADM), contrast sensitivity function (CSF), etc. In some operational scenarios, either averaged or weighted averaged distortions/errors/costs can be used for selecting a specific reshaping mapping for a luma or chroma component/channel.

Specifical reshaping functions/mappings/curves for individual input images as selected based on individual input images can be used to perform reshaping operations in connection with the input images.

Additionally, optionally or alternatively, operational parameters that (e.g., explicitly, etc.) define the specific reshaping functions/mappings/curves or equivalent or approximating lookup tables can be included as reshaping metadata as a part of overall image metadata carried in an encoded video signal encoded with reshaped images to enable recipient devices to perform reshaping operations as appropriate in generating reconstructed images.

In some operational scenarios, an ML based approach may be implemented or performed to classify an image into a specific category of images among a plurality of categories of images. The plurality of categories of images correspond to a plurality of sets of forward and/or inverse backward reshaping functions/mappings/curves. Each category of images in the plurality of categories corresponds to a respective sets of reshaping functions/mappings/curves in the plurality of sets of forward and/or inverse backward reshaping functions/mappings/curves. The respective sets of reshaping functions/mappings/curves may be specifically designated, specifically optimized or customized for reshaping images (e.g., input images, forward reshaped images, etc.) in the (corresponding) category of images.

Under this ML based approach, an ML model such as a neural network may be trained with training dataset(s) comprising training images and labels representing ground truth for each of the training images. The ground truth for a training image identifies a specific category of images—among the plurality of categories of images—to which the training image belongs. As a result, the ground truth can be used to identify a specific set of reshaping functions/mappings/curves or operational parameters that (e.g., explicitly, etc.) define or specify the specific set of reshaping functions/mappings/curves.

In a training stage, the ML model can be used to classify or predict categories for some or all of the training images in the training dataset(s). The predicted categories can be compared with ground truth categories indicated or identified by labels for the training images. Errors in the category predictions can be measured, calculated (e.g., as L1 or L2 distance values, etc.) and/or back propagated to update or optimize operational parameters used in the ML model such as weights/biases in the neural network. The ML model may be repeatedly or iteratively optimized, for example using a gradient descent approach or a stochastic gradient descent approach.

Additionally, optionally or alternatively, in a validation or testing stage, the trained ML model and trained/optimized operational parameters used therein can be validated and/or further optimized/fine-tuned using training/validation images in training/validation dataset(s) comprising training/validation images and labels representing ground truth identifying a corresponding categories of image for each of the training/validation images. Prediction accuracies or errors in the category predictions can be measured, calculated (e.g., as L1 or L2 distance values, etc.) and/or used to further optimize or fine-tune the operational parameters used in the ML model.

In an inference or actual deployment stage, the trained ML can be used to classify an image into a specific category of images. A specific set of forward and/or backward/inverse reshaping functions/mappings/curves may be selected or identified for the image.

By way of example but limitation, for All Intra (AI) coding at a designated QP value range such as a normal QP range, where QP=22, 27, 32, 37, sixteen (16) variances or sets of reshaping functions/mappings/curves labeled with indices 0, 1, . . . , 15 may respectively correspond to sixteen (16) categories into which images may be classified. Training and/or validation dataset(s) may comprise training/validation images classified into these categories based on labels specified for these training/validation images. As a result, reshaping parameters selection/determination (or identifying a corresponding set of forward and/or backward/inverse reshaping functions/mappings/curves for an image) problem can be treated as an image/video classification problem.

Example training datasets as described herein may include, but are not necessarily limited to only, one or more of: RGB training image databases, SDR training image databases, HRD training image databases, HDR P3 PQ image datasets, SCC image databases, DIV2K, Flicker2K (e.g., images with 2K spatial resolution, etc.), subsets of the ImageNet database (e.g., images with various different resolutions, etc.), combinations of the foregoing, and so on.

A neural network used as an ML model as described herein for image reshaping parameters prediction training/validation/testing may include: one or more of: CNN(s) and/or residual learning neural networks such as ResNet(s). For training/validation/testing/prediction/inference, inputs to the ML model may include image patches transformed—obtained from original images with image transformation operations such as resizing, cropping, flipping, rotation, etc. Additionally, optionally or alternatively, inputs to the ML model may include extracted features (e.g., histogram, bin-variance, standard deviation, gradients, etc.) from images available in one or more training dataset(s). Outputs generated by the ML model may include predicted target image category (or class) labels, which may be compared, measured or validated with ground truths in the training and validation/testing stages. Patch size (e.g., for input image patches, etc.), batch size (e.g., for each iteration or epoch of weight/bias updating or optimization, etc.), learning rate, number of epochs, etc., can be adjusted for different training image databases or datasets.

Specifical reshaping functions/mappings/curves for individual input images as selected based on the classified image categories of individual input images can be used to perform reshaping operations in connection with the input images.

Additionally, optionally or alternatively, operational parameters that (e.g., explicitly, etc.) define the specific reshaping functions/mappings/curves or equivalent or approximating lookup tables can be included as reshaping metadata as a part of overall image metadata carried in an encoded video signal encoded with reshaped images to enable recipient devices to perform reshaping operations as appropriate in generating reconstructed images.

Reshaping Function/Mapping Representations and Coding Syntaxes

A reshaping function/mapping as described herein can be represented in various forms or reshaping models including but not limited to any of: piecewise linear segments, piecewise polynomial segments, using B-spline functions or their tensor products as basis functions, one or more power functions, one or more lookup tables (LUTs), and so on.

In operational scenarios in which an input image has more than one color component/channel to be reshaped, a respective reshaping function can be individually designed, selected or generated for each color component/channel, with or without cross-channel prediction being implemented in the respective reshaping function. For example, the reshaping function/mapping may be applied to (e.g., component, etc.) codewords or pixel values in one color component/channel or multiple color components/channels.

A domain in which the reshaping function/mapping operates—e.g., an original or input image/picture domain in which an input image is represented or a reshaped image/picture domain in which a reshaped image obtained by reshaping the input image is represented—may be one of: an RGB domain, an YCbCr domain, an ICtCp domain, etc.

Forward reshaping and inverse reshaping functions/mappings may have different representations and different sets of operational parameters. In some operational scenarios, for global reshaping as depicted in FIG. 2A (a), both forward reshaping parameters and inverse reshaping parameters are included in a global reshaping model (e.g., a polynomial based global reshaping model, a LUT based global reshaping model, etc.).

In some operational scenarios, for image/picture adaptive reshaping such as implemented with codec architectures of FIG. 1B or FIG. 1C that incorporate in-loop reshaping operations, both forward and inverse reshaping parameters are included and sent/signaled in an encoded video signal or a corresponding coded bitstream.

In some operational scenarios such as in-loop and out-of-loop reshaping for intra coding images (or image slices) only or out-of-loop reshaping for both intra coding and inter coding images (or image slices), only inverse reshaping functions/mappings or operational parameters used therein are included and sent/signaled in an encoded video signal or a corresponding coded bitstream.

In some operational scenarios such as luma mapping chroma scaling (LMCS) operations in accordance with an applicable video coding specification such as the VVC specification, only forward reshaping functions/mappings or operational parameters used therein are included and sent/signaled in an encoded video signal or a corresponding coded bitstream. Inverse/backward reshaping functions/mappings or operational parameter used therein can be derived from the signaled forward reshaping functions/mappings or the signaled operational parameters for the forward reshaping functions/mappings.

Training an ML model such as a NN may make use of a gradient decent method to calculate or update the ML model parameters. By definition, gradient descent is a first-order iterative optimization algorithm used to search for a local minimum of a differentiable function such as a reshaping function. Accordingly, the reshaping function needs to be (e.g., first order, etc.) differentiable to avoid discontinuity, singularity or instability in the search algorithm.

This differentiability condition can be easily met by a reshaping model that is built upon a set of spline functions as basis functions, a single piece polynomial of the first order or greater (order>=1), a multi-piece polynomial of the second order or greater (order>=2).

For a reshaping function built upon a reshaping models such as a LUT (with discretized values) or piecewise linear segments, a violation of the first order differentiability by the reshaping function would likely cause problems such as failure to locate the minimum, failure to converge, slow to converge, numeric instability, etc., during the ML-based reshaping model training or reshaping parameter estimation at the encoder side.

One of many ways to solve or avoid these issues under techniques as described herein may be to use either a ML-based reshaping model such as one based on differentiable functions B-spline functions, a single piece polynomial, etc., to first (e.g., in a training stage, etc.) estimate or predict reshaping parameters for a reshaping function/mapping (e.g., in connection with reshaping an image, etc.) and then use (e.g., in an inference or deployment stage, etc.) other constructs—which may or may not support the first order differentiability—such as piecewise linear segments or a LUT to approximate, or infer operational parameters of the constructs used to approximate, the reshaping function/mapping specified or defined with the estimated reshaping parameters.

Reshaping parameters can be conveyed in an encoded video signal from an upstream device such as a video encoder to a downstream recipient device such as a video decoder using coding syntaxes and syntax elements in accordance with an applicable image/video coding specification such as the VVC specification. In some operational scenarios, specific reshaping parameters are signaled for image adaptive reshaping operations (or reshaper). In some operational scenarios, a reshaping model identification (denoted as "reshaper_model_idc") as a part of relatively high level reshaping parameters is signaled for global reshaping operations (or reshaper), as detailed reshaping parameters that specify the global reshaping mapping/function are already included in a preconfigured reshaping model at the decoder side.

TABLE 1 below illustrates an example syntax comprising syntax elements for encoding high level reshaping parameters in a high level syntax (HLS) for encoding video signal in accordance with the applicable image/video coding specification. The HLS can be VPS, SPS, PPS, PH, SH and SEI message, etc., in the video coding specification.

TABLE 1

Example Syntax for High Level Reshaping Parameters

| | Descriptor |
|---|---|
| reshaper_syntax( payloadSize ) { | |
|   reshaper_enabled_flag | u(1) |
|   if ( reshaper_enabled_flag ) { | |
|     reshaper_inloop_flag | u(1) |
|     reshaper_adaptive_model_flag | u(1) |
|     if (reshaper_adaptive_model_flag) { | |
|       reshaper_mapping_data( ) | |
|     } else { | |
|     for ( cmp = 0; cmp < 3; cmp++ ) | |
|       reshaper_model_idc [cmp] | ue(v) |
|     } | |
|   } | |
| } | |

In TABLE 1, a syntax element denoted as "reshaper_enabled_flag" equaling one (1) specifies that reshaping operations (or reshaper) are used in video (e.g., encoding, decoding, transcoding, etc.) codec(s). The syntax element "reshaper_enabled_flag" equaling (0) specifies that reshaping operations (or reshaper) are not used in video (e.g., encoding, decoding, transcoding, etc.) codec(s).

A syntax element denoted as "reshaper_inloop_flag" equaling one (1) specifies that the reshaping operations (or reshaper) are used as a part of coding operations in the coding loop (or in-loop). The syntax element "reshaper_inloop_flag" equaling zero (0) specifies that the reshaping operations (or reshaper) are used as pre- or post-processing operations to coding operations in the coding loop (or out-of-loop).

In some operational scenarios, the syntax element "reshaper_inloop_flag" may only need to be signaled or sent when inter (frame) coding is applied. In some operational scenarios in which frame is intra coded, the syntax element "reshaper_inloop_flag" can be used to signal where inverse/backward reshaping operations (or reshaper) are applied. If the syntax element "reshaper_inloop_flag" equals one (1), then the inverse reshaper is applied before in-loop filtering. On the other hand, if the syntax element "reshaper_inloop_flag" equals zero (0), then the inverse reshaper is applied after in-loop filtering.

A syntax element denoted as "reshaper_adaptive_model_flag" equaling one (1) specifies that picture/image adaptive reshaping is used in the codec(s). The syntax element "reshaper_adaptive_model_flag" equaling zero (0) specifies that a corresponding global reshaping maping/function is already stored or fixed in the codec(s).

A syntax element denoted as "reshaper_model_idc[cmp]" can be used to indicate a reshaping model (e.g., linear polynomials, non-linear polynomials, LUT, etc.) used in the reshaping operations (or reshaper) with codewords in a color component or channel (of a color space) identified by a value denoted as "cmp". In some operational scenarios, this syntax element may be used if the reshaping operations are performed based on multiple mapping functions/mappings to geneate reshaped codewords in multiple color components/channels. Based on this syntax element, the downstream recipient device or the video decoder can determine which reshaping function/mapping is applied to which input or pre-reshaped codewords in one or more input color components/channels to generate reshaped codewords in an output or reshaped color component/channel.

In the global reshaping, some or all of the rehaping parameters such as those carried in the foregoing syntax or syntax elements to specify or define the global reshaping mapping/function may already have been prestored or fixed at the downstream recipient device of the encoded video signal. As a result, these reshaping parameters do not need to be carried, included or signaled in the encoded video signal.

TABLE 2 below illustrates example reshaping model identification values (denoted as "model_idc" or "reshaper_model_idc[cmp]"). In some operational scenarios in which both forward reshaping and inverse/backward reshaping are performed, the same reshaping model identification value may be used to identify the same reshaping model in which forward and inverse/backward reshaping mappings/functions are represented. In some operational scenarios in which both forward reshaping and inverse/backward reshaping are performed, different reshaping model identification values may be used to identify different reshaping models in which forward reshaping mapping/function and inverse/backward reshaping mapping/function are respectively represented. For example, the syntax element "reshaper_model_idc" with multiple data field values can be used to indicate a reshaping function/mapping pair formed by the forward and inverse/backward reshaping mappings/functions. Additionally, optionally or alternatively, the syntax element "reshaper_model_idc" can be replaced by or split into a syntax element "forward_reshaper_model_idc" and "inverse_reshaper_model_idc" to be respectively used to indicate the forward and inverse/backward reshaping mappings/functions.

TABLE 2

Reshaping Model Identification

| model_idc | mapping function |
|---|---|
| 0 | piecewise linear |
| 1 | piecewise polynomial |
| 2 | piecewise polynomial with crosschannel prediction, such as MMR |
| 3 | Power |
| 4 | LOOKUP LUT |
| 5 | B-spline |
| 6 . . . 8 | Reserved |

In some operational scenarios, it is not necessary to include or signal both forward and inverse/backward reshaping parameters. In an example, only inverse/backward reshaping is performed at the decoder side. Hence, the forward reshaping parameters may not need to be included or signaled in an encoded video signal in the present example. In another example, as in VVC, the forward reshaping parameters are included or signaled in an encoded video signal. Hence, a downstream recipient device that need to perform inverse/backward reshaping can derive inverse reshaping parameters from the signaled forward reshaping parameters.

In a first example, some or all of the remaining reshaping parameters in addition to the high level reshaping parameters may be carried or included in a visual dynamic range (VDR) coding syntax such as one denoted as "reshaper_mapping_data( )" in TABLEs 3 below, where each of parameters "num_y_partitions_minus1" and "num_x_partitions_minus1" is set to zero (0), as described in U.S. Pat. No. 10,136,162, which is incorporated herein by reference in its entirety.

TABLE 3

Example VDR Reshaper Mapping Data Syntax

|  | Descriptor |
|---|---|
| reshaper_mapping_data ( ) { <br>   for ( y = 0; y <= num_y_partitions_minus1; y ++ ) { <br>     for ( x = 0; x <= num_x_partitions_minus1; x ++ ) { <br>       rpu_data_mapping(y, x) <br> rpu_data_mapping( y, x ) { <br>   num_cmps = 3 <br> \ <br>   for ( pivot_idx = 0; pivot_idx < num_pivots_minus2[ cmp ] + 1; pivot_idx++ ) { <br>     mapping_idc[ y ][ x ][ cmp ][ pivot_idx ] | ue(v) |
|     if ( num_mapping_param_predictors[ y ][ x ][ cmp ][ pivot_idx ] > 0 ) <br>       mapping_param_pred_flag[ y ][ x ][ cmp ][ pivot_idx ] | u(1) |
|     else <br>       mapping_param_pred_flag[ y ][ x ][ cmp ][ pivot_idx ] = 0 <br>     if( mapping_param_pred_flag[ y ][ x ][ cmp ][ pivot_idx ] = = 0 ) <br>       rpu_data_mapping_param(y, x, cmp, pivot_idx) <br>     else { <br>       if( num_mapping_param_predictors[ y ][ x ][ cmp ][ pivot_idx ] > 1 ) <br> diff_pred_part_idx_mapping_minus1[ y ][ x ][ cmp ][ pivot_idx ] | ue(v) |
|     } <br>   } // pivot_idx <br>   } // cmp <br> } <br> rpu_data_mapping_param(y, x, cmp, pivot_idx) { <br>   if( mapping_idc [ y ][ x ][ cmp ][ pivot_idx ] == MAPPING_POLYNOMIAL ) { <br>     poly_order_minus1[ y ][ x ][ cmp ][ pivot_idx ] | ue(v) |
|     if ( poly_order_minus1[ y ][ x ][ cmp ][ pivot_idx ] == 0 ) <br>       linear_interp_flag[ y ][ x ][ cmp ][ pivot_idx ] | u(1) |
|     if ( poly_order_minus1[ y ][ x ][ cmp ][ pivot_idx ] == 0 && <br>         linear_interp_flag[ y ][ x ][ cmp ][ pivot_idx ] ) { <br>       if( coefficient_data_type == 0) <br>         pred_linear_interp_value_int[ y ][ x ][ cmp ][ pivot_idx] | ue(v) |
|       pred_linear_interp_value[ y ][ x ][ cmp ][ pivot_idx] | u(v) |
|       if ( pivot_idx = = num_pivots_minus2[cmp] ) <br>         if( coefficient_data_type == 0 ) <br>           pred_linear_interp_value_int[ y ][ x ][ cmp ][ pivot_idx + 1 ] | ue(v) |
|         pred_linear_interp_value[ y ][ x ][ cmp ][ pivot_idx + 1 ] | u(v) |
|     } // Linear interpolation <br>     else { <br>       for( i = 0 ; i <= poly_order_minus1[ y ][ x ][ cmp ][ pivot_idx ] + 1; i ++ ) { <br>         if( coefficient_data_type == 0 ) <br>           poly_coef_int[ y ][ x ][ cmp ][ pivot_idx ][ i ] | se(v) |
|         poly_coef[ y ][ x ][ cmp ][ pivot_idx ][ i ] | u(v) |
|       } // the i-th order <br>     } // Non-linear <br>   } // Polynomial coefficients <br>   else if( mapping_idc [ y ][ x ][ cmp ][ pivot_idx ] == MAPPING_MMR ) { <br>     mmr_order_minus1[ y ][ x ][ cmp ][ pivot_idx ] | u(2) |
|     if ( coefficient_data_type = = 0 ) <br>       mmr_constant_int[ y ][ x ][ cmp ][ pivot_idx ] | se(v) |
|     mmr_constant[ y ][ x ][ cmp ][ pivot_idx ] | u(v) |
|     for( i = 1; i <= mmr_order_minus1 + 1; i ++ ) { <br>       for (j = 0; j < 7; j++) { <br>         if ( coefficient_data_type = = 0 ) <br>           mmr_coef_int[ y ][ x ][ cmp ][ pivot_idx ][ i ] [ j ] | se(v) |
|         mmr_coef[ y ][ x ][ cmp ][ pivot_idx ][ i ][ j ] | u(v) |
|       } // the j-th coefficients <br>     } // the i-th order <br>   } // MMR coefficients <br>   else if( mapping_idc [ y ][ x ][ cmp ][ pivot_idx ] == MAPPING_POWER ) { <br>     for ( i = 0; i < 5; i ++ ) { <br>       if ( coefficient_data_type = = 0 ) <br>         pow_coef_int [ y ][ x ][ cmp ][ pivot_idx ][ i ] | se(v) |
|       pow_coef[ y ][ x ][ cmp ][ pivot_idx ][ i ] | u(v) |
|     } // the i-th coefficients <br>   } // Power coefficients <br>   else if ( mapping_idc [ y ][ x ][ cmp ][ pivot_idx ] == | |

TABLE 3-continued

Example VDR Reshaper Mapping Data Syntax

| | Descriptor |
|---|---|
| MAPPING_LUT ) { | |
|    for ( i = pivot_value [ pivot_idx ]; i < pivot_value[ pivot_idx + 1 ]; i ++ ) { | |
|       if ( coefficient_data_type = = 0 ) | |
|          pred_LUT_value_int[ y ][ x ][ cmp ][ i ] | ue(v) |
|          pred_LUT_value[ y ][ x ][ cmp ][ i ] | u(v) |
|    } | |
|    if ( pivot_idx = = num_pivots_minus2[ cmp ] ) { | |
|       if ( coefficient_data_type = = 0 ) | |
|          pred_LUT_value_int[ y ][ x ][ cmp ][pivot_value[ pivot_idx + 1 ] ] | ue(v) |
|          pred_LUT_value[ y ][ x ][ cmp ][pivot_value[ pivot_idx + 1 ] ] | u(v) |
|    } | |
| } // IDLUT cofficients | |
| } | |

In a second example, some or all of the remaining reshaping parameters in addition to the high level reshaping parameters may be carried in an applicable coding syntax such as one denoted as "reshaper_mapping_data( )" in TABLE 4 below, as described in the Luma Mapping Chroma Scaling (LMCS) syntax in Versatile Video Coding, Recommendation ITU-T H.266 (August 2020), which is incorporated herein by reference in its entirety.

TABLE 4

Example VCC LMCS Reshaper Mapping Data Syntax

| | Descriptor |
|---|---|
| reshaper_mapping_data ( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |
|     if( aps_chroma_present_flag ) { | |
|   lmcs_delta_abs_crs | u(3) |
|   if( lmcs_delta_abs_crs > 0 ) | |
|     lmcs_delta_sign_crs_flag | u(1) |
|   } | |
| } | |

Additionally, optionally or alternatively, in some operational scenarios, some or all channel-specific reshaping parameters for some or all (e.g., three, etc.) color components/channels may be carried or included in an applicable coding syntax such as one denoted as "inv_reshaper_mapping_data( )" in TABLE 5 below, as a part of the LMCS syntax in VVC coding.

TABLE 5

Example Channel-Specific VCC LMCS Reshaper Mapping Data Syntax

| | Descriptor |
|---|---|
| inv_reshaper_mapping_data ( ) { | |
|   for ( cmp = 0; cmp < 3; cmp++ ) { | |
|     min_bin_idx[cmp] | ue(v) |
|     delta_max_bin_idx[cmp] | ue(v) |
|     delta_cw_prec_minus1[cmp] | ue(v) |
|     for( i = min_bin_idx[cmp]; i <= MaxBinIdx[cmp]; i++ ) { | |
|       delta_abs_cw[cmp] [ i ] | u(v) |
|       if( delta_abs_cw[cmp] [ i ] > 0 ) | |
|         delta_sign_cw_flag[cmp] [ i ] | u(1) |
|     } | |
| } | |

In some operational scenarios, reshaping operations (or reshaper) can be implemented using B-spline functions, as described in U.S. Provisional Application No. 62/908,770, filed on 1 Oct. 2019, "TENSOR-PRODUCT B-SPLINE PREDICTOR," by Guan-Ming Su et al., the entire contents of which are hereby incorporated by reference as if fully set forth herein.

B-splines are splines (or spline functions) with a sequence of knots $t_i \ldots t_n$ that satisfy constraints as follows:

$$B_{i,n}(x) = \begin{cases} 0 & \text{if } x < t_i \text{ or } x \geq t_n \\ \text{nonzero} & \text{else} \end{cases} \quad (2\text{-}1)$$

$$\sum_i B_{i,n}(x) = 1, x \in [t_i, t_n) \quad (2\text{-}2)$$

Given a series of knot values $t_i, \ldots, t_n$, a spline or a B-spline can be uniquely identified.

B-spline function have certain characteristics which makes it well suited for (e.g., ML, non-ML, reshaping, etc.) model training/optimization. The derivative of a B-spline of degree K is simply a function of B-splines of degree k−1. B-splines are capable of being continuous across knots up to a specific order. For example, as long as one distinct knot is provided, a B-spline is capable of providing the first order derivative used in many backpropagation techniques for training/optimizing ML models, neural networks, etc.

B-splines being non-zero only on a relatively compact support in combination with their summation property means that linear combinations of B-splines are unlikely to cause numerical instability in (e.g., ML, non-ML, reshaping, etc.) model training/optimization, since their maximum values can be defined or controlled entirely by weight values used in generating the linear combinations.

The representational power of the B-spline (functions) is relatively large. For example, (e.g., linear, tensor product, etc.) combinations of B-splines of order n can be used to form or provide basis functions for other functions including but not limited to all other splines of the same order n.

In a third example, some or all of the remaining reshaping parameters in addition to the high level reshaping parameters may be carried in an applicable coding syntax for cross-channel reshaping operations as illustrated in TABLE 6 below, as described in the previously mentioned in the U.S. Provisional Application No. 62/908,770.

TABLE 6

Example B-Spline Cross-Channel Reshaper Mapping Data Syntax

```
else if( mapping_idc [ y ][ x ][ cmp ] == MAPPING_TPB ) {
   tpb num knot minus1[ y ][ x ][ cmp ][0]                              ue(v)
   tpb num knot minus1[ y ][ x ][ cmp ][1]                              ue(v)
   tpb num knot minus1[ y ][ x ][ cmp ][2]                              ue(v)
   tpb order minus1[ y ][ x ][ cmp ][0]                                 ue(v)
   tpb order minus1[ y ][ x ][ cmp ][1]                                 ue(v)
   tpb order minus1[ y ][ x ][ cmp ][2]                                 ue(v)
   // TPB coefficients layers
   for( i = 0; i < tpb_num_basis[ y ][ x ][ cmp ][0]; i ++ ) { // for 1st
channel
      for( j = 0; j < tpb_num_basis[ y ][ x ][ cmp ][1]; j ++ ) { // for
2nd channel
         for( k = 0; k < tpb_num_basis[ y ][ x ][ cmp ][2]; k ++ ) { //
for 3rd channel
            tpb_zero_coef[ y ][ x ][ cmp ][ i ][ j ][ k ]                u(1)
            if( tpb_zero_coef[ y ][ x ][ cmp ][ i ][ j ][ k ] == 0 ) {// for
non-zero
               tpb_int[ y ][ x ][ cmp ][ i ][ j ][ k ]                   se(v)
               tpb coef[ y ][ x ][ cmp ][ i ][ j ][ k ]                  u(v)
            }
   }}}
}
```

Additionally, optionally or alternatively, some or all of the remaining reshaping parameters in addition to the high level reshaping parameters may be carried in an applicable coding syntax for single-channel reshaping operations as illustrated in TABLE 7 below.

TABLE 7

Example B-Spline Single-Channel Reshaper Mapping Data Syntax

```
else if( mapping_idc [ y ][ x ][ cmp ] == MAPPING_TPB ) {
   tpb num knot minus1[ y ][ x ][ cmp ]                          0      ue(v)
   tpb_order_minus1[ y ][ x ][ cmp ]                             0      ue(v)
   // TPB coefficients layers
   for( i = 0; i < tpb_num_basis[ y ][ x ][ cmp ]; i ++ ) {
      tpb zero coef[ y ][ x ][ cmp ][ i ]                        0      u(1)
         if( tpb zero coef[ y ][ x ][ cmp ][ i ] == 0 ) { // for non-zero
            tpb int[ y ][ x ][ cmp ][ i ]                        0      se(v)
            tpb coef[ y ][ x ][ cmp ][ i ]                       0      u(v)
         }
   }
}
```

Figure 3A:
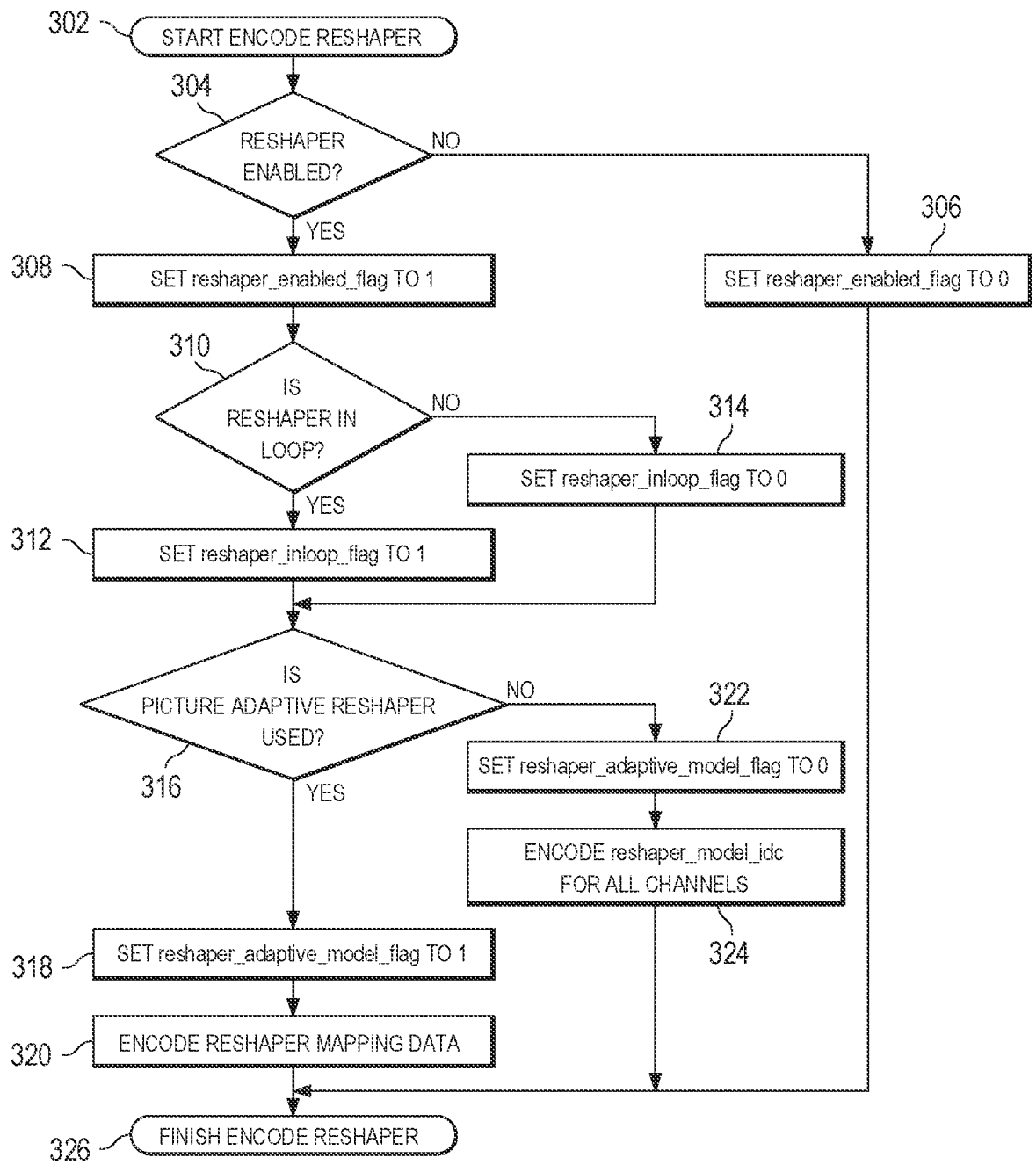
FIG. 3A illustrates an example process flow for encoding reshaping parameters.

FIG. 3A illustrates an example process flow for encoding reshaping parameters for reshaping operations (denoted as "reshaper") into an encoded video signal using coding syntaxes in accordance with an applicable video coding specification. These reshaping parameters can enable or cause a recipient device of the encoded video signal to perform reshaping operations at the decoder side in connection with images included in and decoded from the encoded video signal.

Block 302 comprises starting or initializing encoding operations that encode operational parameters for reshaping operations (or reshaper) in one or more data units or designated data fields (e.g., header data fields, non-header data fields, image sequence level, image/picture level, slice level, etc.) therein carried by the encoded video signal.

Block 304 comprises determining whether reshaping operations are enabled.

Block 306 comprises, in response to determining that reshaping operations are disabled, the reshaping parameter "reshaper_enabled_flag" in the operational parameters for reshaping operations is set to false or zero (0). The process flow goes to block 326, which ends or finishes the encoding operations for reshaping parameters.

Block 308 comprises, in response to determining that reshaping operations are enabled, the reshaping parameter "reshaper_enabled_flag" in the operational parameters for reshaping operations is set to true or one (1). Block 310 comprises determining whether reshaping operations are implemented or performed as in-loop operations.

Block 312 comprises, in response to determining that reshaping operations are in-loop operations, the reshaping parameter "reshaper_inloop_flag" in the operational parameters for reshaping operations is set to true or one (1).

Block 314 comprises, in response to determining that reshaping operations are not in-loop operations, the reshaping parameter "reshaper_inloop_flag" in the operational parameters for reshaping operations is set to false or zero (0).

Block 316 comprises determining whether reshaping operations are implemented or performed as image or picture adaptive operations. Block 318 comprises setting the reshaping parameter "reshaper_adaptive_model_flag" in the operational parameters for reshaping operations to true or one (1), in response to determining that reshaping operations are image or picture adaptive. Block 320 comprises encoding some or all the remaining reshaping parameters (or reshaper mapping data) using applicable coding syntaxes such as those illustrated in TABLEs 3 through 7 above (e.g., with image-specific values, etc.) for each image/picture subject to the image/picture adaptive reshaping operations.

Block 322 comprises, in response to determining that reshaping operations are not in-loop operations, setting the reshaping parameter "reshaper_adaptive_model_flag" in the operational parameters for reshaping operations to false or zero (0). Block 324 comprises encoding the parameter "reshaper_model_idc" as illustrated in TABLE 2 above for some or all images/pictures in some or all color components/channels subject to global reshaping operations.

The process flow then goes from block 320 or 324 to block 326, which ends or finishes the encoding operations for the reshaping parameters.

Figure 3B:
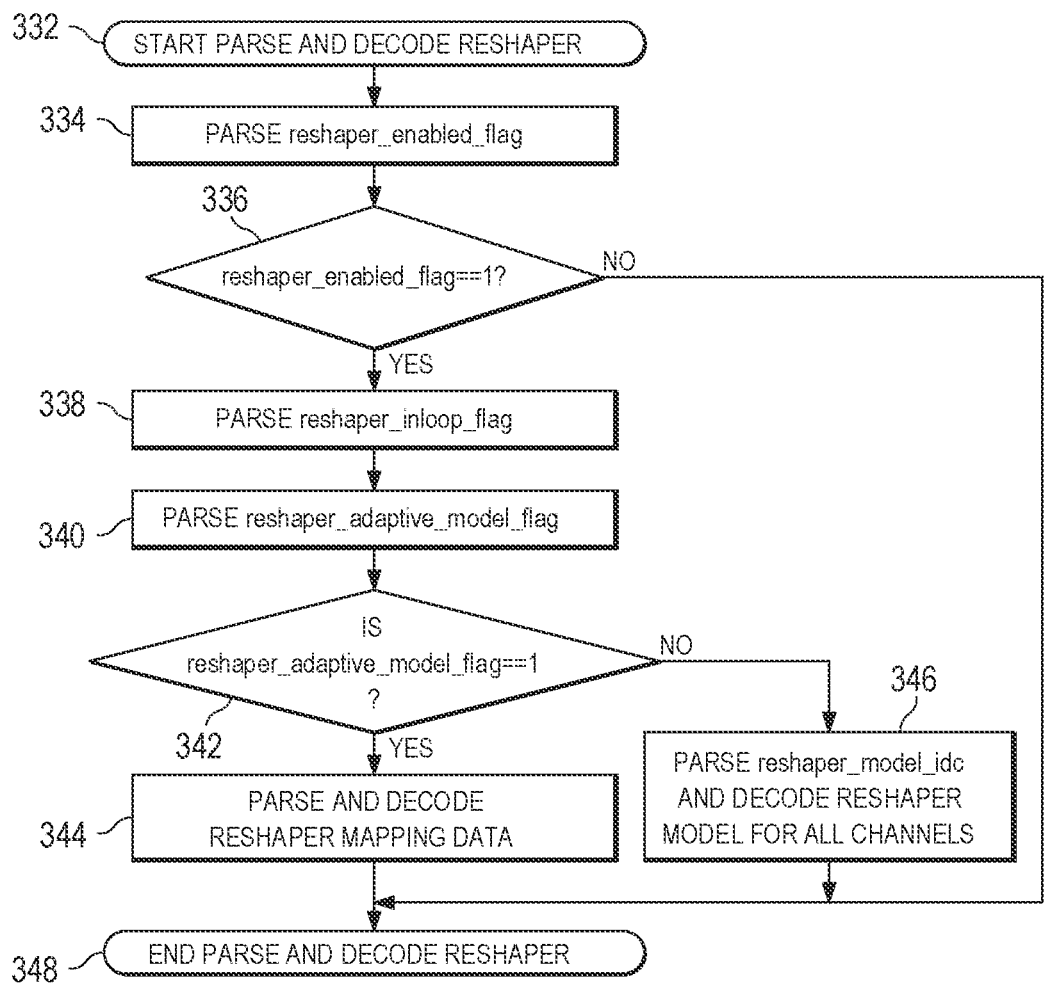
FIG. 3B illustrates an example process flow for parsing or decoding reshaping parameters.

FIG. 3B illustrates an example process flow for decoding or parsing reshaping parameters for reshaping operations (denoted as "reshaper") from an encoded video signal using coding syntaxes in accordance with an applicable video coding specification. These reshaping parameters can be used by a recipient device of the encoded video signal to perform reshaping operations at the decoder side in connection with images included in and decoded from the encoded video signal.

Block 332 comprises starting or initializing parsing or decoding operations that parse or decode operational parameters for reshaping operations (or reshaper) from one or more data units or designated data fields (e.g., header data fields, non-header data fields, image sequence level, image/picture level, slice level, etc.) therein carried in the encoded video signal.

Block 334 comprises parsing or decoding the reshaping parameter "reshaper_enabled_flag". Block 336 comprises determining whether the reshaping parameter "reshaper_enabled_flag" has a value of true or one (1).

The process flow goes to block 348, which ends or finishes the parsing or decoding operations for reshaping parameters, in response to determining that the reshaping parameter "reshaper_enabled_flag" does not have a value of true or one (1). On the other hand, the process flow goes to block 338, in response to determining that the reshaping parameter "reshaper_enabled_flag" has a value of true or one (1).

Block 338 comprises parsing or decoding the reshaping parameter "reshaper_inloop_flag". Block 340 comprises parsing or decoding the reshaping parameter "reshaper_adaptive_model_flag". Block 342 comprises determining whether the reshaping parameter "reshaper_adaptive_model_flag" has a value of true or one (1).

Block 344 comprises, in response to determining that the reshaping parameter "reshaper_adaptive_model_flag" has a value of true or one (1), parsing or decoding the remaining reshaping parameters (or reshaper mapping data) using applicable coding syntaxes such as those illustrated in TABLEs 3 through 7 above (e.g., with image-specific values, etc.) for each image/picture subject to the image/picture adaptive reshaping operations.

Block 346 comprises, in response to determining that the reshaping parameter "reshaper_adaptive_model_flag" does not have a value of true or one (1), parsing or decoding the parameter "reshaper_mode_idc" as illustrated in TABLE 2 above for some or all images/pictures in some or all color components/channels subject to global reshaping operations.

The process flow then goes from block 344 or 346 to block 348, which ends or finishes the parsing/decoding operations for the reshaping parameters.

Learning Based Reshapers for Explicit or Implicit Mapping

ML based reshaping operations (or reshapers) can be implemented or performed to support explicit mapping or implicit mapping.

As discussed herein, reshaping mappings may be explicitly generated, represented and signaled from an upstream device to a downstream recipient device, for example using coding syntaxes as illustrated in TABLEs 1 through 7 above to encode, parse or decode reshaping parameters in an encoded video signal. Additionally, optionally or alternatively, reshaping mappings may not be explicitly generated, represented and signaled from an upstream device to a downstream recipient device. Instead, a reshaping model may implement or perform implicit (reshaping) mapping in reshaping operations.

Figure 1D:
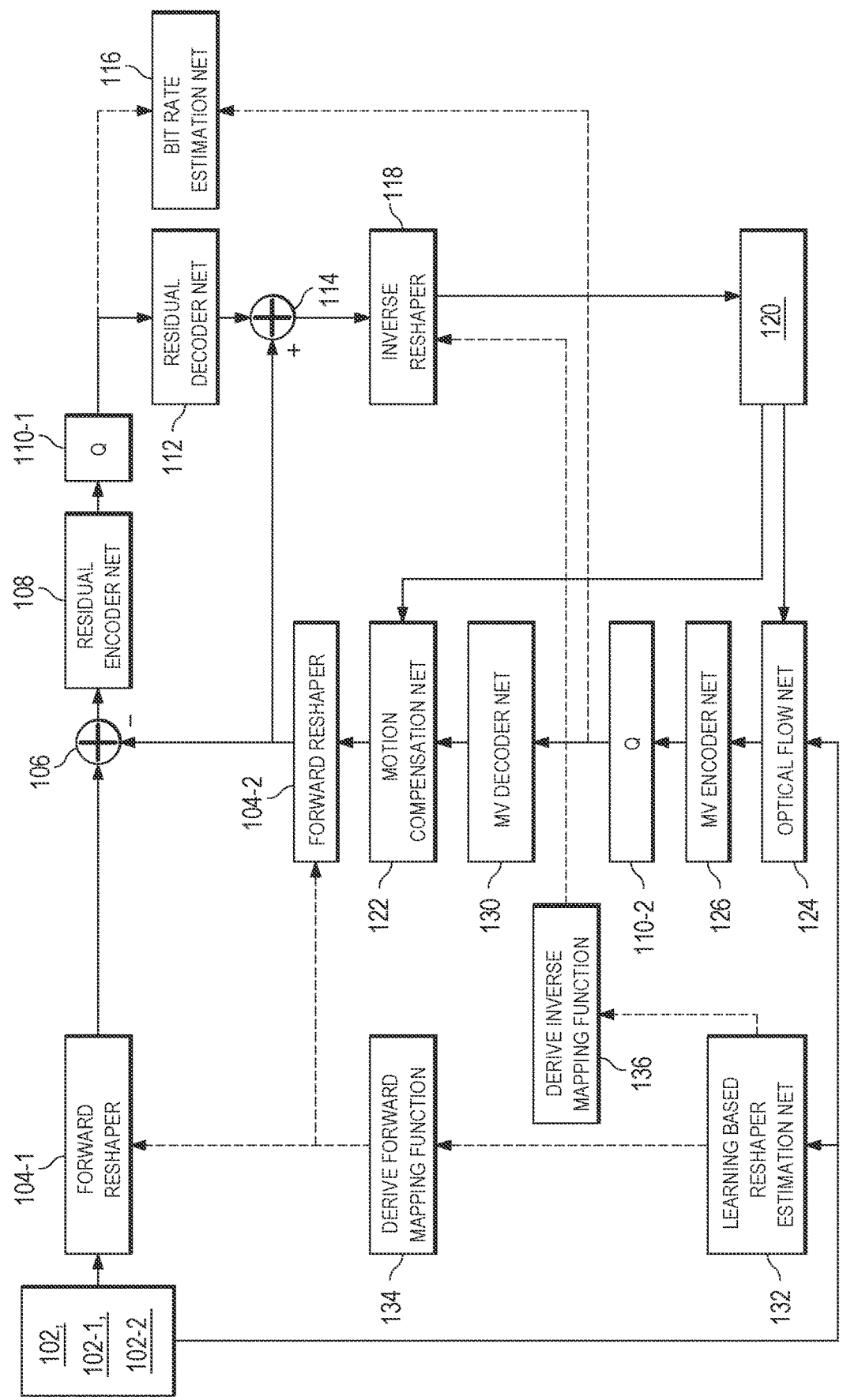

FIG. 1D illustrates an example codec architecture that supports explicit mapping for learning-based reshaping operations.

Explicit mapping means reshaping parameters explicitly specifying at least one of forward and inverse/backward reshaping mappings in coding syntaxes used to encode an encoded video signal as described herein. In contrast, implicit mapping means no reshaping parameters explicitly specifying any of forward and inverse/backward reshaping mappings in coding syntaxes used to encode an encoded video signal as described herein.

In a training stage, a ML based model—which may be implemented with a neural network such as a learning-based reshaper estimation net as illustrated in FIG. 1D—may be trained/optimized with training images in training dataset(s) to predict (explicit) operational parameters (e.g., as illustrated in TABLEs 1 through 7 above, etc.) that specify or define forward reshaping mappings/functions used in forward reshaping operations as well as to predict (explicit) operational parameters that specify or define inverse or backward reshaping mappings/functions used in inverse or backward reshaping operations.

In an inference or actual deployment stage, at the encoder side, the ML based model or the learning-based reshaper estimation net as illustrated in FIG. 1D receives and uses the input image (102) as input to predict (explicit) operational or reshaping parameters (e.g., as illustrated in TABLEs 1 through 7 above, etc.) that specify or define forward and inverse/backward reshaping mappings/functions used in forward and inverse/backward reshaping operations in connection with the input image (102).

Some or all of these reshaping parameters can be received and used by operations 134 to derive the forward reshaping mapping/function, which can then be applied by the first instance (104-1) and the second instance (104-2) of a forward reshaper to forward reshape a pre-reshaped image into a forward reshaped image.

Some or all of these reshaping parameters can be received and used by operations 136 to derive the inverse/backward reshaping mapping/function, which can then be applied by an inverse/backward reshaper (118) to inverse/backward reshape a forward reshaped image into a reconstructed image (e.g., approximating the input image (102), etc.).

The predicted reshaping parameters can be encoded into an encoded video signal along with a forward reshaped image generated from forward reshaping the input image (102). These predicted reshaping parameters can be specific for and adaptive to the input image (102).

In the inference or actual deployment stage, at the decoder side, a downstream recipient device implementing decoder-side codec architecture as illustrated in FIG. 1D (with similar decoder side processing blocks of FIG. 1B) receives and decodes the forward reshaped image (102-1) and the reshaping parameters in the image metadata (102-2) as input.

The downstream device can perform the operations (134) using some or all of these reshaping parameters to derive the forward reshaping mapping/function, which can then be applied by the second instance (104-2) of the forward reshaper to forward reshape a pre-reshaped image into a forward reshaped image.

The downstream device can perform the operations (136) using some or all of these reshaping parameters to derive the inverse/backward reshaping mapping/function, which can then be applied by the inverse/backward reshaper (118) to inverse/backward reshape the forward reshaped image (102-1) into a reconstructed image (e.g., approximating the input image (102), etc.).

Figure 1E:
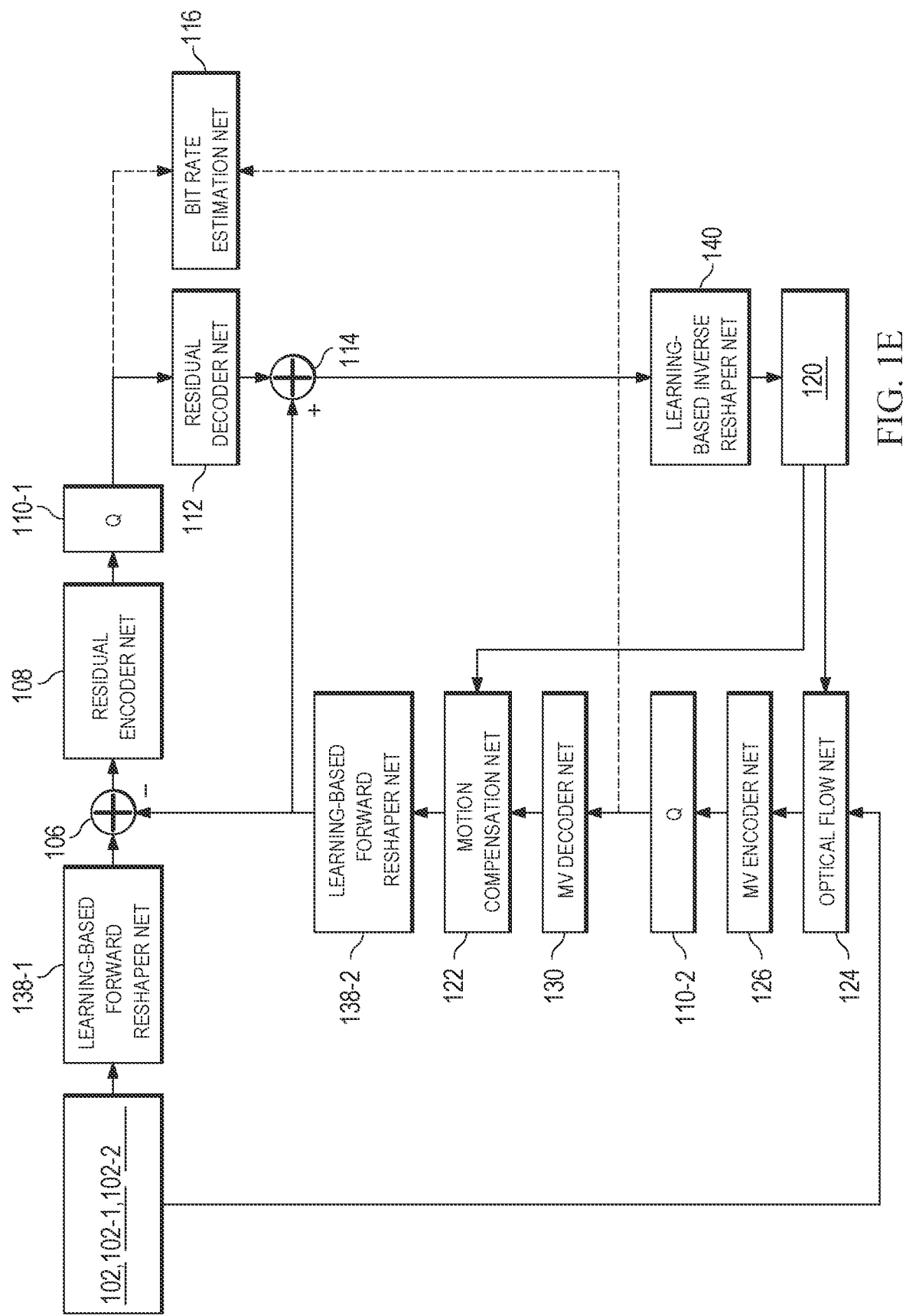

FIG. 1E illustrates an example codec architecture that supports implicit mapping for learning-based reshaping operations. As noted, implicit mapping means that a reshaping mapping is not represented in coding syntaxes used to encode or decode an encoded signal. Implicit mapping may be used or implemented by pre-storing or pre-configuring trained ML-based reshaper models at video coding devices (e.g., encoder, decoder, etc.) when the ML-based reshaper model contains too numerous operational parameters (e.g., millions of parameters such as weights/biases used in a neural network such as a CNN, etc.) to be efficiently signaled with a relatively limited bitrate at runtime. However, in some operational scenarios, some or all of optimized operational parameters of ML-based reshaper models (e.g., weights/biases in ML neural networks, ML nets, etc.) can be signaled or transmitted in an encoded video signal as described herein in accordance with coding syntaxes or syntax elements (in addition to those illustrated in TABLEs 1-7 above) of an applicable video coding specification, especially when the total number of these parameters or the total data volume to carry these parameters are relatively small (e.g., below a specific data volume threshold, weights/biases parameters are relatively few, the bitrate used to carry these ML model parameters is relatively small as compared with a bitrate overhead threshold, etc.).

In a training stage, a ML based forward reshaping model—which may be implemented with a neural network such as a learning-based forward reshaper net 138-1 and 138-2 as illustrated in FIG. 1E—may be trained/optimized with training images in training dataset(s) to perform forward reshaping operations in connection with the training images to generate corresponding forward reshaped images, without generating (explicit) operational parameters (e.g., as illustrated in TABLEs 1 through 7 above, etc.) that specify or define forward reshaping mappings/functions used in the forward reshaping operations.

In the training stage, a ML based inverse/backward reshaping model—which may be implemented with a neural network such as a learning-based inverse/backward reshaper net 140 as illustrated in FIG. 1E—may be trained/optimized with the training images in the training dataset(s) to perform inverse/backward reshaping operations in connection with the training images to generate corresponding inverse/backward reshaped images, without generating (explicit) operational parameters (e.g., as illustrated in TABLEs 1 through 7 above, etc.) that specify or define inverse/backward reshaping mappings/functions used in the inverse/backward reshaping operations.

In an inference or actual deployment stage, at the encoder side, the ML based forward reshaping model or the learning-based forward reshaper net (138-1 or 138-2) in FIG. 1E receives and uses the input image (102) as input to perform forward reshaping operations without using any explicitly represented forward reshaping mapping or function to forward reshape a pre-reshaped image into a forward reshaped image.

Likewise, at the encoder side, the ML based backward reshaping model or the learning-based inverse/backward reshaper net (140) in FIG. 1E receives and uses a forward reshaped image as input to perform inverse/backward reshaping operations without using any explicitly represented inverse/backward reshaping mapping or function to inverse/backward reshape the forward reshaped image into a reconstructed image.

Some or all reshaping parameters (e.g., except one or two flags to indicate implicit reshaping, etc.) can be omitted from being encoded into an encoded video signal encoded with a forward reshaped image generated from forward reshaping the input image (102). In other words, the encoded video signal can be free of carrying reshaping parameters that define or specify reshaping mappings/functions for reshaping operations to be performed by a recipient device of the encoded video signal.

In the inference or actual deployment stage, at the decoder side, a downstream recipient device implementing decoder-side codec architecture as illustrated in FIG. 1E (with similar decoder side processing blocks of FIG. 1B), which is preconfigured or deployed with the ML based forward and inverse/backward reshaping model such as the learning based forward reshaper net (138-1 or 138-2) and/or the learning based inverse/backward reshaper net (140) with their respective trained neural network operational parameters, receives and decodes the forward reshaped image (102-1) and the image metadata (102-2) as input. The image metadata (102-2) contains no reshaping parameters that explicitly define or specify reshaping mappings/functions for reshaping operations to be performed by the downstream device.

The downstream device can use the trained or preconfigured learning-based forward reshaper net (138-1 or 138-2) to forward reshape a pre-reshaped image into a forward reshaped image. Likewise, the downstream device can use the trained or preconfigured learning-based inverse/backward reshaper net (140) to inverse/backward reshape a forward reshaped image into an inverse/backward reshaped image.

One or both of the forward and inverse/backward reshaper nets (138 or 140) may be implemented with a neural network that implement machine learning to reshape a to-reshaped image or signal represented in an input domain to a reshaped image or signal represented in an output domain via a relatively high dimensional transform. One or both of the forward and inverse/backward reshaper nets (138 or 140)

may be trained with supervised learning (e.g., using training dataset(s) that include ground truths or labels, using a model testing/validation stage, etc.), or with un-supervised learning (e.g., using metric, error, objective, cost functions, using filters to convolve with image data to determine objective image features, motions, segments, luminances, chrominances, structures, properties, etc., of the image data, etc.), or with a combination of supervised and un-supervised learning.

A learning-based reshaping net as described herein can be implemented as a CNN. The CNN may be described as (Cin, Cout, K×K conv). Here, Cin represents the total number of input color channels/components in which input image data to the CNN is represented. Cout represents the total number of output color channels/components in which output image data from the CNN is represented. K×K conv indicates a reference to a convolutional filter of a kernel size K (pixels)×K (pixels) used to convolve the input image data in the CNN.

Figure 2C:
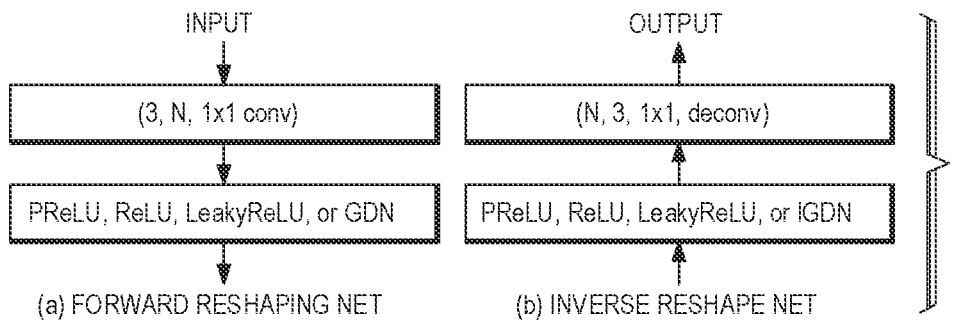
FIG. 2C illustrates example forward and inverse/backward reshaper nets.

FIG. 2C illustrates example forward and inverse/backward reshaper nets (e.g., 138 of FIG. 1E, 140 of FIG. 1E, etc.) implemented at least in part as CNNs.

As shown, the forward reshaper net uses a (forward reshaping) CNN described as (3, N, 1×1 conv), which means that the CNN with a convolution filter of a kernel size 1 (pixel)×1 (pixel) is to reshape input image data represented in three (3) color channels/components (e.g., RGB channels or components in an RGB color space, YUV channels/components in a YUV color space, etc.) in an input domain to output image data represented in a relatively high dimension of N channels in an output domain. By way of comparison, in non-reshaping applications, CNN with convolutional filters of kernel sizes other than 1×1 can be used to perform spatial filtering that detect or respond to underlying spatial structures or image features of input images and to extract features from the input images. In contrast, the (reshaping) CNN with the kernel filter of 1×1 kernel size herein is to reshape input signal/image or individual codeword encoded therein. The kernel size 1×1 is specified to ensure that spatial filtering is not performed on the input images. Cross-channel matrix may be used to convert codewords represented in the three input channels/components of an input domain or color space into terms (e.g., first-order terms corresponding to color channels and second-order or higher terms corresponding to products of color channels, etc.) of different orders, where the terms of the different orders may be placed in a design matrix or column comprising N channels. As a result, the output domain may not be a directly watchable color space. In other words, the newly reshaped signal or newly reshaped image from the (forward reshaping) CNN may not comprise codewords of a color space and may not be directly viewable. In comparison, a reshaped signal o reshaped image from a non-CNN reshaper not implementing techniques as described herein may be represented in a color space and may be directly viewable.

Conversely, the inverse/backward reshaper net uses a (backward or inverse reshaping) CNN described as (N, 3, 1×1 conv), which means that the CNN with a deconvolution filter of a kernel size 1 (pixel)×1 (pixel) is to (inverse/backward) reshape received image data represented in the relatively high dimension of N channels in the output domain to reconstructed image data in three (3) color channels/components (e.g., RGB channels/components in an RGB color space, YUV channels/components in a YUV color space, etc.) in a reconstructed image/picture domain (which may or may not be the same as the input domain). In these operational scenarios, the CNNs use 1×1 kernels to reshape pixel or codeword/signal values rather than to derive filtered values based on multiple pixel or codeword/signal values corresponding to multiple spatial neighborhood pixels. As in the case of forward reshaping, the (inverse reshaping) CNN with the kernel filter of 1×1 kernel size herein is to inverse reshape reshaped signal/image or individual reshaped codeword encoded therein. The kernel size 1×1 is specified to ensure that spatial filtering is not performed on reshaped images. Cross-channel matrix may be used to convert codewords represented in the N channels of the output domain (not directly viewable) to reconstructed codewords represented in three input channels/components of a reconstructed domain or color space, which may be the same as the input domain or color space. As a result, the reconstructed domain may be a directly watchable color space. In other words, the newly reconstructed signal or newly reconstructed image from the (backward or inverse reshaping) CNN may comprise codewords of a color space and may be directly viewable.

In some operational scenarios, as shown in FIG. 2C, the learning based reshaper can be implemented using a CNN net consisting one or more modules such as conv (convolutional unit) ReLU (rectifier linear unit), leaky ReLU (leaky ReLU), PRELU (parametric ReLU), GDN (generalized divisive normalization) or IGDN (for inverse operation) to provide or introduce nonlinear properties in mapping, reshaping or converting the received image data to the output image data. In some operational scenarios, the reshaper of FIG. 2C (a) can be used to implement the forward reshaper net represented in block 138-1 and/or 138-2 in FIG. 1E, whereas a reshaper of FIG. 2C (b) can be used to implement the backward or inverse reshaper net represented in block 140 in FIG. 1E.

Example Process Flows

Figure 4A:
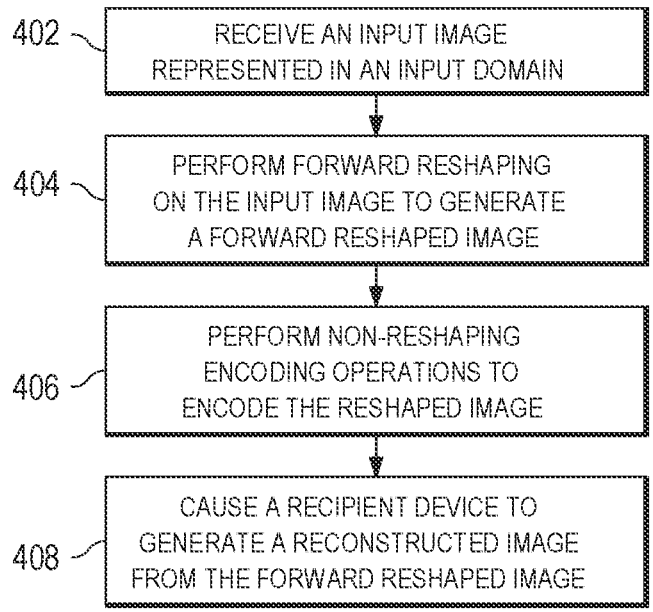
FIG. 4A and FIG. 4B illustrate example process flows.

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system receives, from an input video signal, an input image represented in an input domain.

In block 404, the image processing system performs forward reshaping on the input image to generate a forward reshaped image represented in a reshaped image domain.

In block 406, the image processing system performs non-reshaping encoding operations to encode the reshaped image into an encoded video signal. At least one of the non-reshaping encoding operations is implemented with a machine learning (ML) model that has been previously trained with training images in one or more training datasets in a preceding training stage.

In block 408, the image processing system causes a recipient device of the encoded video signal to generate a reconstructed image from the forward reshaped image. The reconstructed image is used to derive a display image to be rendered on an image display operating with the recipient device.

In an embodiment, the non-reshaping encoding operations include one or more of: optical flow analysis, motion vector encoding, motion vector decoding, motion vector quantization, motion compensation, residual encoding, residual decoding, residual quantization, etc.

In an embodiment, the input domain corresponds to a color space that is one of: a RGB color space, a YUV color space, an IPT color space, another different color space, etc.

In an embodiment, the forward reshaping is performed as out-of-loop image processing operations performed before the non-reshaping encoding operations.

In an embodiment, the forward reshaping is performed as a part of overall in-loop image processing operations that include the non-reshaping encoding operations.

In an embodiment, an image metadata portion for the forward reshaped image is a part of image metadata carried by the encoded video signal; the image metadata portion includes one or more of: forward reshaping parameters for the forward reshaping, or backward reshaping parameters for inverse reshaping.

In an embodiment, the image metadata portion includes reshaping parameters that explicitly specifies a reshaping mapping for one of the forward reshaping or the inverse reshaping.

In an embodiment, the reshaping parameters that explicitly specifies a reshaping mapping are generated by one of: a ML-based reshaping mapping prediction method, or a non-ML-based reshaping mapping generation method.

In an embodiment, the image metadata portion includes a reshaping parameter that identifies the forward reshaping as one of: global mapping or image adaptive mapping.

In an embodiment, the forward reshaping is performed with an implicit reshaping mapping embodied with weights and biases of a neural network that have been previously trained with training images in one or more training datasets; the weights and biases of the neural network are not signaled to the recipient device.

In an embodiment, the forward reshaping is performed with an implicit reshaping mapping embodied with weights and biases of a neural network that have been previously trained with training images in one or more training datasets; at least one of the weights and biases of the neural network is signaled to the recipient device.

Figure 4B:
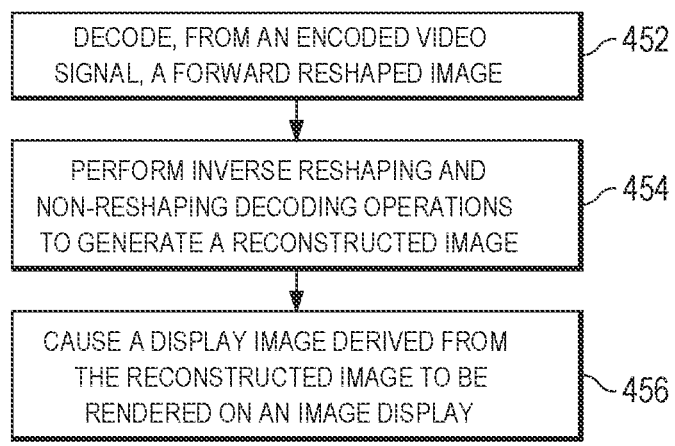

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes, from an encoded video signal, a forward reshaped image represented in a reshaped image domain. The forward reshaped image was generated by an upstream device by forward reshaping an input image represented in an input image domain.

In block 454, the video decoding system performs inverse reshaping on, as well as non-reshaping decoding operations in connection with, the forward reshaped image to generate a reconstructed image represented in a reconstructed image domain. The inverse reshaping and forward reshaping form a reshaping operation pair. At least one of the non-reshaping decoding operations is implemented with a machine learning (ML) model that has been previously trained with training images in one or more training datasets in a preceding training stage.

In block 456, the video decoding system causes a display image derived from the reconstructed image to be rendered on an image display.

In an embodiment, the inverse reshaping is performed with an implicit reshaping mapping embodied with weights and biases of a neural network that have been previously trained with training images in one or more training datasets; the weights and biases of the neural network are not signaled to the recipient device.

In an embodiment, the inverse reshaping is performed with an implicit reshaping mapping embodied with weights and biases of a neural network that have been previously trained with training images in one or more training datasets; at least one of the weights and biases of the neural network is signaled to the recipient device.

In an embodiment, the inverse reshaping is performed with a reshaping mapping signaled in an image metadata portion for the forward reshaped image carried in the encoded video signal as a part of image metadata.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE 1. A method comprising:
receiving, from an input video signal, an input image represented in an input domain;
performing forward reshaping on the input image to generate a forward reshaped image represented in a reshaped image domain;
performing non-reshaping encoding operations to encode the reshaped image into an encoded video signal, wherein at least one of the non-reshaping encoding operations is implemented with a machine learning (ML) model that has been previously trained with training images in one or more training datasets in a preceding training stage;
causing a recipient device of the encoded video signal to generate a reconstructed image from the forward reshaped image, wherein the reconstructed image is used to derive a display image to be rendered on an image display operating with the recipient device.

EEE 2. The method of EEE 1, wherein the forward reshaped image is generated by the forward reshaping performed with a first convolutional neural network that uses a convolutional filter of spatial kernel size of 1 pixel×1 pixel to forward reshape each input codeword in the input image in three color channels to a respective forward reshaped codeword in N channels, where N represents an integer no less than three; wherein the reconstructed image is generated by backward reshaping performed with a second convolutional neural network that uses a second convolutional filter of spatial kernel size of 1 pixel×1 pixel to backward reshape each forward reshaped codeword in the input image in the N channels to a respective reconstructed codeword in the three color channels.

EEE 3. The method of EEE 2, wherein the first convolutional neural network includes a non-linear mapping of input codewords in the input image to forward reshaped codewords in the N channels.

EEE 4. The method of any of EEEs 1-3, wherein the non-reshaping encoding operations include one or more of: optical flow analysis, motion vector encoding, motion vector decoding, motion vector quantization, motion compensation, residual encoding, residual decoding, or residual quantization.

EEE 5. The method of any of EEEs 1-4, wherein the input domain corresponds to a color space that is one of: a RGB color space, a YUV color space, an IPT color space, or another different color space.

EEE 6. The method of any of EEEs 1-5, wherein the forward reshaping is performed as out-of-loop image processing operations performed before the non-reshaping encoding operations.

EEE 7. The method of any of EEEs 1-5, wherein the forward reshaping is performed as a part of overall in-loop image processing operations that include the non-reshaping encoding operations.

EEE 8. The method of any of EEEs 1-7, wherein an image metadata portion for the forward reshaped image is a part of image metadata carried by the encoded video signal; wherein the image metadata portion includes one or more of: forward reshaping parameters for the forward reshaping, or backward reshaping parameters for inverse reshaping.

EEE 9. The method of EEE 8, wherein the image metadata portion includes reshaping parameters that explicitly specifies a reshaping mapping for one of the forward reshaping or the inverse reshaping.

EEE 10. The method of EEE 9, wherein the reshaping parameters that explicitly specifies are reshaping mapping are generated by one of: a ML-based reshaping mapping prediction method, or a non-ML-based reshaping mapping generation method.

EEE 11. The method of any of EEEs 1-10, wherein the image metadata portion includes a reshaping parameter that identifies the forward reshaping as one of: global mapping or image adaptive mapping.

EEE 12. The method of any of EEEs 1-11, wherein the forward reshaping is performed with an implicit reshaping mapping embodied with weights and biases of a neural network that have been previously trained with training images in one or more training datasets; wherein the weights and biases of the neural network are not signaled to the recipient device.

EEE 13. The method of any of EEEs 1-12, wherein the forward reshaping is performed with an implicit reshaping mapping embodied with weights and biases of a neural network that have been previously trained with training images in one or more training datasets; wherein at least one of the weights and biases of the neural network is signaled to the recipient device.

EEE 14. A method comprising:
decoding, from an encoded video signal, a forward reshaped image represented in a reshaped image domain, wherein the forward reshaped image was generated by an upstream device by forward reshaping an input image represented in an input image domain;
performing inverse reshaping on, as well as non-reshaping decoding operations in connection with, the forward reshaped image to generate a reconstructed image represented in a reconstructed image domain, wherein the inverse reshaping and forward reshaping form a reshaping operation pair, wherein at least one of the non-reshaping decoding operations is implemented with a machine learning (ML) model that has been previously trained with training images in one or more training datasets in a preceding training stage;
causing a display image derived from the reconstructed image to be rendered on an image display.

EEE 15. The method of EEE 14, wherein the inverse reshaping is performed with an implicit reshaping mapping embodied with weights and biases of a neural network that have been previously trained with training images in one or more training datasets; wherein the weights and biases of the neural network are not signaled to the recipient device.

EEE 16. The method of EEE 14 or 15, wherein the inverse reshaping is performed with an implicit reshaping mapping embodied with weights and biases of a neural network that have been previously trained with training images in one or more training datasets; wherein at least one of the weights and biases of the neural network is signaled to the recipient device.

EEE 17. The method of EEE 14 or 15, wherein the inverse reshaping is performed with a reshaping mapping signaled in an image metadata portion for the forward reshaped image carried in the encoded video signal as a part of image metadata.

EEE 18. The method of any one of EEEs 1-17, wherein at least one of the non-reshaping encoding operations is implemented with a machine learning (ML) model that has been previously trained with training images represented in the reshaped image domain.

EEE 19. The method of EEE 7, wherein the in-loop operations are performed as a part of encoding and/or decoding operations.

EEE 20. An apparatus comprising a processor and configured to perform any one of the methods recited in EEEs 1-19.

EEE 21. A non-transitory computer-readable storage medium having stored thereon computer-executable instruction for executing a method with one or more processors in accordance with any of the methods recited in EEEs 1-19.

The invention claimed is:

1. A method comprising:
receiving, from an input video signal, an input image represented in an input domain;
performing forward reshaping on the input image to generate a forward reshaped image represented in a reshaped image domain;
wherein the forward reshaped image is generated by performing the forward reshaping with a neural network that includes a non-linear mapping of input codewords in the input image to forward reshaped codewords in N channels, where N represents an integer no less than three;
performing non-reshaping encoding operations to encode the reshaped image into an encoded video signal, wherein at least one of the non-reshaping encoding operations is implemented with a machine learning (ML) model that has been previously trained with training images in one or more training datasets in a preceding training stage;
causing a recipient device of the encoded video signal to generate a reconstructed image from the forward reshaped image, wherein the reconstructed image is used to derive a display image to be rendered on an image display operating with the recipient device.

2. The method of claim 1, wherein the neural network represents a first convolutional neural network that uses a convolutional filter of spatial kernel size of 1 pixel×1 pixel to forward reshape each input codeword in the input image in three color channels to a respective forward reshaped codeword in N channels, where N represents an integer no less than three; wherein the reconstructed image is generated by inverse reshaping performed with a second convolutional neural network that uses a second convolutional filter of spatial kernel size of 1 pixel×1 pixel to inverse reshape each forward reshaped codeword in the input image in the N channels to a respective reconstructed codeword in the three color channels.

3. The method of claim 1, wherein the non-reshaping encoding operations include one or more of: optical flow analysis, motion vector encoding, motion vector decoding, motion vector quantization, motion compensation, residual encoding, residual decoding, or residual quantization.

4. The method of claim 1, wherein the forward reshaping is performed as out-of-loop image processing operations performed before the non-reshaping encoding operations.

5. The method of claim 1, wherein the forward reshaping is performed as a part of overall in-loop image processing operations that include the non-reshaping encoding operations.

6. The method of claim 5, wherein the overall in-loop image processing operations are encoding operations.

7. The method of claim 1, wherein an image metadata portion for the forward reshaped image is a part of image metadata carried by the encoded video signal; wherein the image metadata portion includes one or more of: forward reshaping parameters for the forward reshaping, or backward reshaping parameters for inverse reshaping.

8. The method of claim 7, wherein the image metadata portion includes reshaping parameters that explicitly specifies a reshaping mapping for one of the forward reshaping or the inverse reshaping.

9. The method of claim 8, wherein the reshaping parameters that explicitly specifies are reshaping mapping are generated by one of: a ML-based reshaping mapping prediction method, or a non-ML-based reshaping mapping generation method.

10. The method of claim 1, wherein the image metadata portion includes a reshaping parameter that identifies the forward reshaping as one of: global mapping or image adaptive mapping.

11. The method of claim 1, wherein the forward reshaping is performed with an implicit reshaping mapping embodied with weights and biases of a neural network that have been previously trained with training images in one or more training datasets.

12. A method comprising:
decoding, from an encoded video signal, a forward reshaped image represented in a reshaped image domain, wherein the forward reshaped image was generated by an upstream device by forward reshaping an input image represented in an input image domain;
wherein the forward reshaped image was generated by the upstream device performing the forward reshaping with a neural network that includes a non-linear mapping of input codewords in the input image to forward reshaped codewords in N channels, where N represents an integer no less than three;
performing inverse reshaping on, as well as non-reshaping decoding operations in connection with, the forward reshaped image to generate a reconstructed image represented in a reconstructed image domain, wherein the inverse reshaping and forward reshaping form a reshaping operation pair, wherein at least one of the non-reshaping decoding operations is implemented with a machine learning (ML) model that has been previously trained with training images in one or more training datasets in a preceding training stage;
causing a display image derived from the reconstructed image to be rendered on an image display.

13. The method of claim 12, wherein the inverse reshaping is performed with an implicit reshaping mapping embodied with weights and biases of a neural network that have been previously trained with training images in one or more training datasets.

14. The method of claim 12, wherein the inverse reshaping is performed with a reshaping mapping signaled in an image metadata portion for the forward reshaped image carried in the encoded video signal as a part of image metadata.

15. An apparatus comprising a processor and configured to perform the method recited in claim 1.

* * * * *